United States Patent
Smith et al.

(10) Patent No.: US 12,010,239 B2
(45) Date of Patent: Jun. 11, 2024

(54) TALKING HEAD DIGITAL IDENTITY AUTHENTICATION

(71) Applicant: AvaWorks Incorporated, Santa Monica, CA (US)

(72) Inventors: Roberta Jean Smith, Santa Monica, CA (US); Nicolas Antczak, Sherman Oaks, CA (US)

(73) Assignee: AvaWorks Incorporated, Santa Monica, CA (US)

( * ) Notice: Subject to any disclaimer, the term of this patent is extended or adjusted under 35 U.S.C. 154(b) by 0 days.

(21) Appl. No.: 18/108,616

(22) Filed: Feb. 11, 2023

(65) Prior Publication Data

US 2023/0299964 A1    Sep. 21, 2023

Related U.S. Application Data

(60) Provisional application No. 63/309,494, filed on Feb. 11, 2022.

(51) Int. Cl.
*H04L 29/06* (2006.01)
*H04L 9/00* (2022.01)
*H04L 9/32* (2006.01)

(52) U.S. Cl.
CPC .......... *H04L 9/3236* (2013.01); *H04L 9/3247* (2013.01); *H04L 9/50* (2022.05)

(58) Field of Classification Search
CPC .............. G06Q 20/401; G06Q 20/3825; H04L 9/3236; H04L 9/3247; H04L 9/50
See application file for complete search history.

(56) References Cited

U.S. PATENT DOCUMENTS

| | | | |
|---|---|---|---|
| 6,919,892 B1 | 7/2005 | Cheiky et al. | |
| 7,027,054 B1 | 4/2006 | Cheiky et al. | |
| 8,359,645 B2 * | 1/2013 | Kramer | H04L 69/40 |
| | | | 726/22 |
| 8,553,037 B2 | 10/2013 | Smith et al. | |
| 8,727,782 B2 | 5/2014 | Brunacini et al. | |
| 9,124,650 B2 | 9/2015 | Maharajh et al. | |
| 10,419,209 B1 * | 9/2019 | Griffin | H04L 9/3263 |
| 10,867,061 B2 | 12/2020 | Collart | |
| 10,922,423 B1 * | 2/2021 | Rungta | G06F 21/604 |
| 10,938,725 B2 | 3/2021 | Sleevi | |

(Continued)

*Primary Examiner* — Taghi T Arani
*Assistant Examiner* — Lin Chang
(74) *Attorney, Agent, or Firm* — Harvey Lunenfeld

(57) ABSTRACT

A talking head digital identity immutable dual authentication method, comprising: publishing a talking head show, downloading talking head file, talking head show file, and signature files for each from a server into a playback device; downloading respective talking head hash and talking head show hashes from a blockchain into the playback device; using a talking head and talking head show public key to validate talking head and talking head show signatures; determining whether the talking head and talking head show signatures are correct, and if correct, a talking head hash and a talking head show hash are calculated and checked against respective hashes downloaded from the blockchain; if the calculated talking head hash and the calculated talking head show hash of the files from the server and the hashes of the talking head and talking head show from the blockchain match, respectively, then playback of the talking head show plays.

16 Claims, 34 Drawing Sheets

(56) References Cited

U.S. PATENT DOCUMENTS

| | | | |
|---|---|---|---|
| 11,095,449 B2 | 8/2021 | Wang | |
| 2010/0085363 A1* | 4/2010 | Smith | H04N 5/262 |
| | | | 345/473 |
| 2010/0305997 A1* | 12/2010 | Ananian | G06Q 10/0633 |
| | | | 715/843 |
| 2017/0033932 A1* | 2/2017 | Truu | H04L 63/102 |
| 2019/0372756 A1* | 12/2019 | Kim | H04L 9/3263 |
| 2019/0378127 A1* | 12/2019 | Dudar | H04L 9/006 |
| 2020/0382536 A1* | 12/2020 | Dherange | G06F 16/906 |
| 2020/0382560 A1* | 12/2020 | Woolward | H04L 63/205 |
| 2021/0135854 A1* | 5/2021 | Karame | G06Q 20/3678 |
| 2021/0256013 A1* | 8/2021 | Yang | G06F 16/2379 |
| 2022/0150294 A1* | 5/2022 | Zavesky | H04L 65/765 |
| 2022/0216997 A1* | 7/2022 | Davies | H04L 9/3239 |
| 2022/0278859 A1* | 9/2022 | Mackay | G06F 21/645 |
| 2022/0300452 A1* | 9/2022 | Diehl | G06F 16/137 |

* cited by examiner

- The block is hashed with the hash number having leading zeros. The number of zeros determines the difficulty of mining.
- Nonce is a random number that is used only once.
- Miners select as many nonces as possible, as fast as possible.
- Each nonce is hashed and its hash is compared to the hash of the block.
- The miner that finds the nonce that generates hash closest to hash of the block without going over is the winner and gets paid in blockchain's cryptocurrency.
- The hash of the winning block is then added to the block.
- The block is hashed again. This hash is block's final hash.
- The block is then added to the blockchain.
- If two miners find the winning nonce, the miner that did most work is the winner.
- Finding the winning nonce is called 'Proof of Work.'

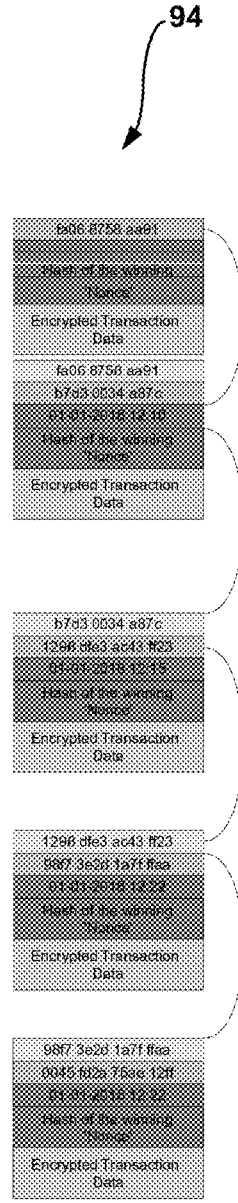

FIG. 15

Adding nonces makes block creation hard work.A "nonce" is a random number used only once.

For example, lets add a 5 digit nonce to a string "Blockchain" and get its hash

```
Sha-256("Blockchain[00000]") = a1e2246362756d82...
```

The goal is to find the nonce that yields a hash with a specified "difficulty", the required number of leading zeros.

The only way to accomplish this is to use the brute force, but with the requirement of more leading zeros, the longer the search will take.

| Message | SHA-256 |
|---|---|
| Blockchain[00000] | a1e2246362756d8... |
| Blockchain[00027] | 0276ede6a4c123dfe... |
| Blockchain[01778] | 0075af1248de1493... |
| Blockchain[13855] | 000983e1ea32df3ed... |
| Blockchain[24354] | 00006448e9768e56... |
| Blockchain[26605] | 000006d53ade32568... |

6167 nonces lead a leading zero, 423 nonces yield at least two zeros,
27 at least 3 and only one yields 5 leading zeros

FIG. 16

Each descriptor is a string of variable length terminated with Double pipe bar characters, "||".

Each descriptor has a format, comprising: Length of file| file name [ |additional data | ... ]||

For Example
12454|picture.png||
87465|audio.amr|voice=1,4,6,2,1,8||

Authentication Schemes

Immutable Dual vs. Distributed Data Network

|  | Immutable Dual Authentication Scheme | Distributed Data Network Dual Authentication Scheme |
| --- | --- | --- |
| Where Hash Codes Reside | On Blockchain | On Blockchain |
| Where Talking Head Resides | On Web Server | On Blockchain Distributed Network |
| Where Talking Head Show Resides | On Web Server | On Blockchain Distributed Network |
| Publisher Verification | Public/Private Key | Publisher Code |

FIG. 34

TALKING HEAD DIGITAL IDENTITY AUTHENTICATION

This application claims the benefit of U.S. Provisional Application No. 63/309,494, filed Feb. 11, 2022, the full disclosure of which is incorporated herein by reference.

BACKGROUND OF THE INVENTION

Field of the Invention

The present invention relates generally to talking head digital identity authentication and more particularly to talking head digital identity immutable dual authentication.

Background Art

Digital communications are an important part of today's world. Individuals and businesses communicate with each other via networks of all types, including the internet. Personal computers, cell phones, e-mail, instant messaging services, and video conferencing, are among the many tools used to convey information between users, and satisfy communications needs via wireless and hard wired networks.

Information is conveyed in video, real time animated, and text based formats having video and audio content, including animated human beings or talking heads, which are capable of conveying identity, emphasizing points in a conversation, and adding emotional content.

Talking heads are used to convey the visual and audio likeness of human beings and other beings via the internet and other networks with far less bandwidth requirements than the bandwidth required to communicate the actual visual and audio likeness.

However, security is an issue. Despite the many benefits of using networks, networking raises a greater potential for security issues, such as data loss, security breaches, malicious attacks, hacking, viruses, financial losses, and intellectual property theft, among others.

Security and protection of the talking heads is necessary, including development, creation, data storage, and communication of the talking heads and associated content.

A system and method for securely creating, distributing, and viewing photo-realistic talking head based multimedia content over a network, and, in particular, a system and method for encrypting, authenticating creating, distributing, and viewing the digital identity of photo-realistic talking heads, photo-realistic head shows, and content for the photo-realistic head and photorealistic talking head shows with a digital identity immutable dual authentication is necessary.

Although talking heads have heretofore been known, none of the talking head creation and communication systems adequately satisfies these needs.

Cheiky, et. al and Smith, et. al. were instrumental in creating and developing talking heads and a system and method for creating, distributing, and viewing photo-realistic talking head based multimedia content over a network U.S. Patent Application Publication No. 20100085363 (Smith, et al.) discloses a photo realistic talking head creation, content creation, and distribution system and method, which comprises a system and method for creating, distributing, and viewing photo-realistic talking head based multimedia content over a network, comprising a server and a variety of communication devices, including cell phones and other portable wireless devices, and a software suite, that enables users to communicate with each other through creation, use, and sharing of multimedia content, including photo-realistic talking head animations combined with text, audio, photo, and video content. Content is uploaded to at least one remote server, and accessed via a broad range of devices, such as cell phones, desktop computers, laptop computers, personal digital assistants, and cellular smartphones. Shows comprising the content may be viewed with a media player in various environments, such as internet social networking sites and chat rooms via a web browser application, or applications integrated into the operating systems of the digital devices, and distributed via the internet, cellular wireless networks, and other suitable networks.

U.S. Pat. No. 7,027,054 (Cheiky, et al.), U.S. Pat. No. 6,919,892 (Cheiky, et al.), and U.S. Pat. No. 8,553,037 (Smith, et al.) disclose do-it-yourself photo realistic talking head creation systems and methods, comprising: a template; a video camera having an image output signal of a subject; a computer having a mixer program for mixing the template and image output signal of the subject into a composite image, and an output signal representational of the composite image; a computer adapted to communicate the composite image signal thereto the monitor for display thereto the subject as a composite image; the monitor and the video camera adapted to allow the video camera to collect the image of the subject therethrough and the subject to view the composite image and the subject to align the image of the subject therewith the template; storage means having an input for receiving the output signal of the video camera representational of the collected image of the subject, and storing the image of the subject substantially aligned therewith the template.

U.S. Pat. No. 8,727,782 (Brunacini, et. al.) discloses hazard-zone incident command training and certification systems designed to train and certify persons to act as at least one responsible person(s) for decision making and management operations as part of an emergency response at incidents that contain at least one hazard zone; such hazard zone defined as any work area which contains a hazard that can injure or kill, for example, burning structures, hazardous material incidents, roadways with active traffic, natural disaster sites, and/or other emergency response scenes.

A computer system, for training at least one applicant in fire-incident management skills in at least one client-server architecture is disclosed, comprising: at least one virtual-immersion computer interface structured and arranged to provide virtual immersion to at least one applicant in at least one fire-incident management situation, wherein the virtual immersion is provided after performing a registration step comprising collecting user identification information comprising at least one management-mentor computer interface that comprises at least one management-mentor computer processor structured and arranged to generate mentoring in the at least one management-mentor computer interface, wherein the mentoring includes at least one video comprising a talking head video in which a fire chief verbally coaches the applicant. The system uses an authentication rights server to preferably authenticate user access to the server environment.

U.S. Pat. No. 10,938,725 (Sleevi) discloses a computer implemented load balancing multimedia conferencing system, device, and methods, which may be configured for multimedia videoconferencing that includes talking heads and talking head services.

A computer implemented load balancing multimedia conferencing method is disclosed that may be used to reduce processing time required for secure 2D and/or 3D multimedia network communications, and may include the steps of:

enabling communication of multimedia content, having audio data that is associated with video frame data, between a sending end-point and a receiving end-point, the receiving end-point having a receiving multimedia content index; determining a load-balancing procedure that divides a video frame of the multimedia content into a first video frame portion and a second video frame portion, the first and second video frame portions associated with audio data; providing the second video frame portion and associated audio data to the receiving end-point; deriving, via the receiving end-point, a third video frame portion using the receiving multimedia content index; and combining, via the receiving end-point, the second video frame portion and derived third video frame portion into a composite video frame.

Security and encryption techniques, such as blockchain and multi-factor authentication data are discussed. Encryption techniques, such as blockchain and authentication methods, such as multi-factor authentication may be used in conjunction with sending and receiving end-point processing. The term "blockchain", as discussed, generally means a distributed database that maintains a continuously growing ledger or list of records, called blocks, secured from tampering and revision using hashes. Every time data may be published to a blockchain database the data may be published as a new block. Each block may include a timestamp and a link to a previous block. Through the use of a peer-to-peer network and a distributed timestamping server, a blockchain database is managed autonomously.

The system may include or be in communication with a blockchain network, having one or more nodes, which may be in communication with one or more servers, and/or client devices. The blockchain network may manage a distributed blockchain database containing data recorded by the one or more electronic devices of the system. The data recorded by the one or more electronic devices may be maintained as a continuously growing ledger or listing of the data recorded by the one or more electronic devices, which may be referred to as blocks, secured from tampering and revision. Each block includes a timestamp and a link to a previous block. Through the use of a peer-to-peer blockchain network and a distributed timestamping server, a blockchain database may be managed autonomously. Consensus ensures that the shared ledgers are exact copies, and lowers the risk of fraudulent transactions, because tampering would have to occur across many places at exactly the same time. Cryptographic hashes, such as the SHA256 computational algorithm, ensure that any alteration to transaction data input results in a different hash value being computed, which indicates potentially compromised transaction input.

Digital signatures ensure that data entry transactions (data added to the blockchain database) originated from senders (signed with private keys) are not imposters. At its core, a blockchain database may record the chronological order of data entry transactions with all nodes agreeing to the validity of entry transactions using the chosen consensus model. The result is data entry transactions that are irreversible and agreed to by all members in the blockchain network.

U.S. Pat. No. 10,867,061 (Collart) discloses systems and methods for authorizing rendering of objects in three-dimensional spaces. The system may include a first system defining a virtual three-dimensional space, including the placement of a plurality of objects in the three-dimensional space, and a second system including a plurality of rules associated with portions of the three-dimensional space and a device coupled to the first system and the second system. The device may receive a request to render a volume of three-dimensional space, retrieve objects for the volume of three-dimensional, retrieve rules associated with the three-dimensional, and apply the rules for the three-dimensional space to the objects.

A registry, which may be used to protect against malicious bots that try to scam or imitate people is disclosed; determine if a voice is real versus auto-generated from the latest generation of deep neural networks; determine if a face is real versus auto-generated; determine changes to security methods we use today (as today's voice recognition or video of a talking head might not be real or valid in the future); determine what type of data virtual assistants and robotic or autonomous devices are allowed to capture, when, how is it used, and how a consumer can control.

The registry may be centralized or decentralized (i.e., using blockchain distributed ledger-based solution). Applications may be registered using a blockchain or another immutable database.

U.S. Pat. No. 9,124,650 (Maharajh, et al.) digital rights management in a mobile environment. Embodiments are discussed, which provide a method that causes a plurality of virtual machine instructions to be interpreted for indications of a mobile device's hardware identification information, thus forming a plurality of hardware instruction interpretations. Talking heads, encryption, authentication, and cipher block chaining techniques are discussed. The embodiment also combines each of the plurality of hardware instruction interpretations and hashes the combination to form a quasi-hardware device identifier. An encryption process is based on the quasi-hardware encryption device identifier and the media is then encrypted using the encryption process. The encrypted media is transferred to the mobile device wherein the mobile device decrypts the media based at least in part on the mobile device's internal knowledge of the quasi-hardware device identification.

U.S. Pat. No. 11,095,449 (Wang) discloses a system and method for securely processing an electronic identity. The method comprises: receiving, by an endpoint device, from an access device, interaction data; generating, by the endpoint device, an interaction record comprising the interaction data and an electronic identity of a user, the electronic identity being mathematically derived from a combination of information associated with the user; retrieving, by the endpoint device, a private key of the user; signing, by the end-point device, the interaction record using the private key of the user; encrypting, by the endpoint device, at least the interaction data using a limited-use key associated with limited-use parameters to form a cryptogram; and transmitting, by the endpoint device, to the access device, the cryptogram and the signed interaction record, wherein the cryptogram is thereafter forwarded to a server computer in an authorization request message, and wherein the server computer is configured to decrypt the cryptogram and validate the electronic identity, wherein the signed interaction record is also signed using a private key of a resource provider and further comprises a transaction timestamp. The method may further comprise: the server computer validating the electronic identity utilizing a distributed network, the distributed network comprising a blockchain.

A talking head and talking head show, comprising a photo-realistic moving likeness of an individual that looks and speaks as the individual does was developed by VeraSprite, a California based company owned by Ava-Works, Inc., also a California based company, and disclosed in U.S. Pat. Nos. 6,919,892 and 7,027,054 (both of Cheiky, et. al.) on Jul. 19, 2005, and Apr. 11, 2006, respectively VeraSprite's technology creates a photo-realistic likeness, a talking head and talking head show, of a spokesperson, professional, or an ordinary human being. After creating their talking head once, the spokesperson need only use his or her voice to create new messages. The person's voice is automatically coordinated with his or her own moving image.

Sponsors can transmit a spokesperson in a moving, lifelike, audio-visual message along with background graphics and slides directly to mobile devices. In addition, sponsors may embed quizzes or links to their websites in their message. Unlike text based messages, talking heads give sponsors an easy, highly personalized, multimedia way to communicate with specialized audiences.

Currently, VeraSprite's technology is used to play multimedia shows on tablets, cell phones, and watches.

AvaWorks, Inc. is a privately held Santa Monica, California based company doing business as VeraSprite™. VeraSprite owns patented technology enabling transmission of photo-realistic moving images to mobile devices.

Security and protection of talking heads and safeguarding the digital identity of the talking heads remains an issue. Despite the many benefits of using networks, networking raises a greater potential for security issues, such as data loss, security breaches, malicious attacks, hacking, viruses, financial losses, and intellectual property theft, among others.

Security and protection of the talking heads and, in particular, security and protection of the digital identity of the talking heads is necessary, during development and creation, and for data storage and communications of the talking heads and associated content.

Although talking heads have heretofore been known, none of the talking head creation and communication systems adequately satisfies the aforementioned needs.

For the foregoing reasons, there is a need for a talking head digital identity immutable dual authentication system and method, which protects the talking heads, talking head shows, and associated content from data loss, security breaches, malicious attacks, hacking, viruses, financial losses, and intellectual property theft.

The talking head digital identity immutable dual authentication system and method should have a system and method for securely creating, distributing, and viewing photo-realistic talking head based multimedia content over a network, and, in particular, a system and method for creating, encrypting, authenticating, distributing, and viewing the digital identity of photo-realistic talking heads, photo-realistic head shows, and content for the photo-realistic head and photorealistic talking head shows with a digital identity immutable dual authentication is necessary.

SUMMARY

The present invention is directed to improvements in security and protection of talking heads and talking head shows and, in particular, a system, method, and scheme for security and protection of the digital identity of talking heads and talking head shows, and associated content from data loss, security breaches, malicious attacks, hacking, viruses, financial losses, and intellectual property theft.

The system, method, and scheme of the present invention may be used to securely create, distribute, and view photo-realistic talking head based multimedia content over a network, and, in particular, create, encrypt, and authenticate the digital identity of photo-realistic talking heads, photo-realistic talking head shows, and content on cell phones, tablets, and other portable devices over a network.

A system, method, and scheme for security and protection of the digital identity of the talking heads and talking head shows, comprises a talking head digital identity immutable dual authentication system and method.

A talking head digital identity immutable dual authentication method having features of the present invention, comprises: publishing a talking head show, downloading talking head file, talking head show file, and signature files for each from a server into a playback device; downloading respective talking head hash and talking head show hashes from a blockchain into the playback device; using a talking head and talking head show public key to validate talking head and talking head show signatures; determining whether the talking head and talking head show signatures are correct, and if correct, a talking head hash and a talking head show hash are calculated and checked against respective hashes downloaded from the blockchain; if the calculated talking head hash and the calculated talking head show hash of the files from the server and the hashes of the talking head and talking head show from the blockchain match, respectively, then playback of the talking head show starts and plays.

In more detail, the talking head digital identity immutable dual authentication method of the present invention, comprises:

publishing a talking head and talking head show, comprising:
  incorporating talking head files and talking head show files into specially formatted files, comprising:
    hashing the talking head specially formatted files and the talking head show specially formatted files, using Merkle tree hashing,
    uploading the hashed talking head specially formatted files and the hashed talking head show specially formatted files, each to a respective blockchain,
    signing the talking head specially formatted files and the talking head show specially formatted files,
    uploading the signed talking head specially formatted files and the signed talking head show specially formatted files, each to a server;
verifying a talking head and talking head show, comprising:
  verifying signatures of the signed talking head specially formatted files and the signed talking head show specially formatted files,
  verifying that hashes of the signed talking head specially formatted files and the talking head show specially formatted files from the server match the hashes of the hashed talking head and the hashed talking head show specially formatted files from the blockchains, comprising:
    downloading the signed talking head specially formatted files and the signed talking head show specially formatted files, each from the server;
    calculating hashes of the downloaded signed talking head specially formatted files and the downloaded signed talking head show specially formatted files, each from the server,
    downloading the hashed talking head specially formatted files and the hashed talking head show specially formatted files, each from the respective blockchain,
    verifying that the hashes of the signed talking head specially formatted files and the hashes of the talking head show specially formatted files from the server match the hashes of the hashed talking head and the hashed talking head show specially formatted files from the blockchains;

playing back the talking head show, if the hashes of the signed talking head specially formatted files and the hashes of the talking head show specially formatted files from the server match the hashes of the hashed talking head and the hashed talking head show specially formatted files from the blockchains.

In yet more detail, the talking head digital identity immutable dual authentication method of the present invention, comprises:

downloading the talking head file, talking head show file, and the respective talking head signature file and talking head show signature file each from the server into a playback device;

downloading respective talking head hash and talking head show hash from the blockchain into the playback device;

using a talking head and talking head show public key by the playback device to validate the talking head and talking head show signatures, which determine whether the talking head signature and talking head show signature are correct;

if the talking head signature and the talking head show signature are correct, then the talking head Merkle tree hash and the talking head show Merkle tree hash are recalculated and checked against the respective hashes retrieved from the blockchain;

if the recalculated talking head Merkle tree hash and the recalculated talking head show Merkle tree hash downloaded from the server and the talking head Merkle tree hash downloaded from the blockchain and the talking head show Merkle tree hash downloaded from the blockchain match, respectively, then playback starts and the talking head show plays.

DRAWINGS

These and other features, aspects, and advantages of the present invention will become better understood with regard to the following description, appended claims, and accompanying drawings where:

FIG. 15 is a schematic representation of blockchain mining and proof of work;

FIG. 16 is a schematic representation of adding nonces to a blockchain;

FIG. 34 is a schematic representation of features of immutable blockchain authentication schemes.

DESCRIPTION

The preferred embodiments of the present invention will be described with reference to FIGS. 1-34 of the drawings. Identical elements in the various figures are identified with the same reference numbers.

Figure 1:
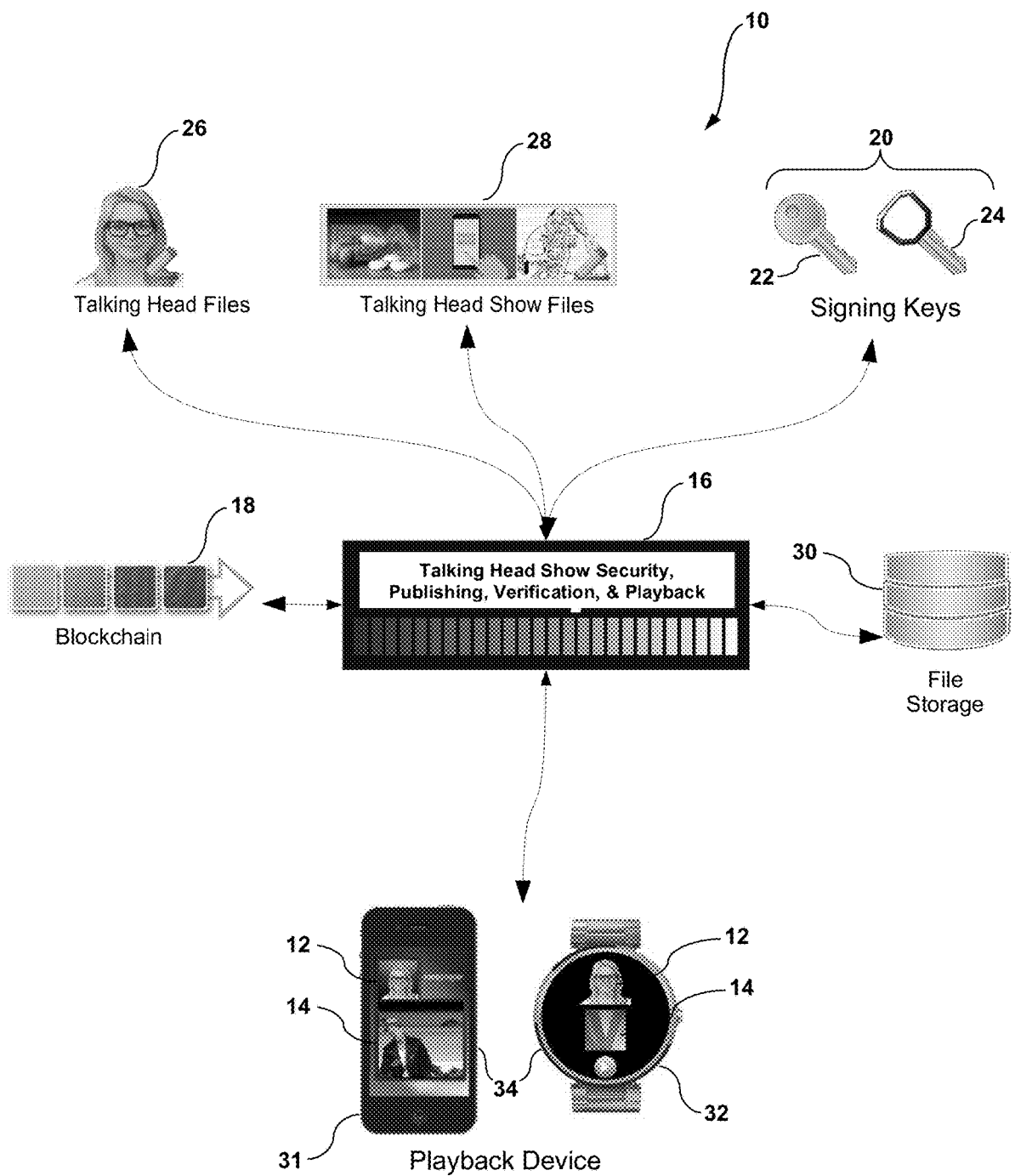
FIG. 1 is a schematic representation of a talking head publishing, verification, and playback system and method of the present invention, constructed in accordance with the present invention.

FIG. 1 shows an embodiment of the present invention, a talking head digital identity immutable dual authentication system, method, and scheme 10. The talking head digital identity immutable dual authentication system, method, and scheme 10 is used for security and protection of the digital identity of talking heads 12 and talking head shows 14 and protects the talking heads 12, talking head shows 14, and associated content from data loss, security breaches, malicious attacks, hacking, viruses, financial losses, and intellectual property theft. Talking head and talking head show security, publishing, verification, and playback 16 are shown, using blockchain 18 and dual authentication 20, which uses a public key 22 and a private key 24.

The talking head digital identity immutable dual authentication system, method, and scheme 10 of the present invention comprises: talking head and talking head show publishing, verification, and playback 16, using blockchain 18 and cryptography.

Talking head files 26 and talking head show files 28 are typically stored in file storage 30 on a server or other suitable storage device, and hashes of the talking head 12 and talking head show 14 are stored on the blockchain 18.

The talking head 12 and talking head show 14 may be played back on playback devices 31 and/or 32 or any other suitable playback device, if the calculated talking head hash and the calculated talking head show hash of the files from a server and the hashes of the talking head and talking head show from the blockchain match, respectively, then playback 34 of the talking head show starts and plays, as shown later.

The talking head 12 and talking head show 14 may be any suitable talking head and/or talking head show. It should be noted that both a VeraSprite™ talking head and/or talking head show are well suited for use in in the talking head digital identity immutable dual authentication system, method, and scheme 10 of FIG. 1.

Figure 2:
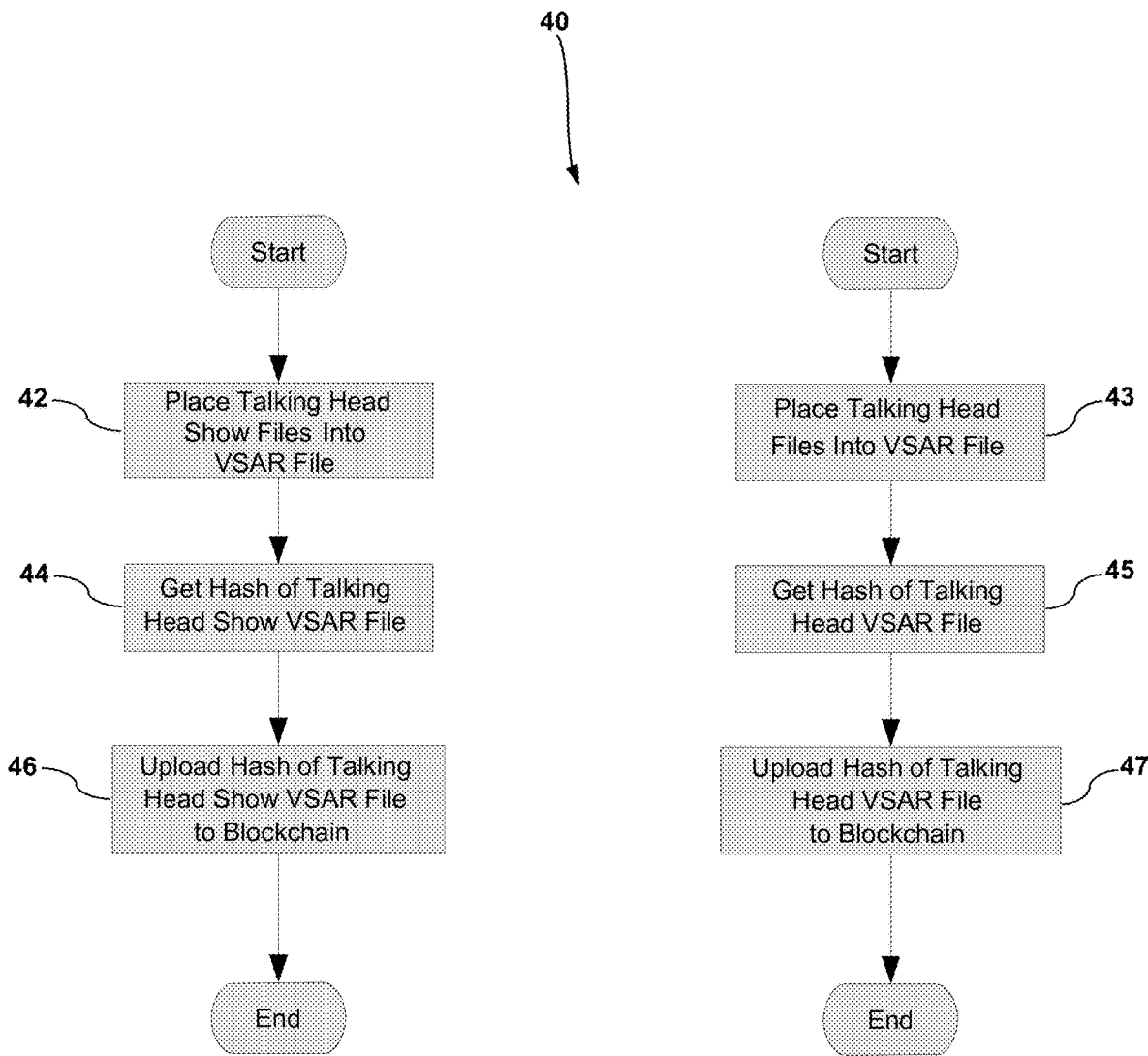
FIG. 2 is a talking head and talking head show publishing flow chart.
Figure 3:
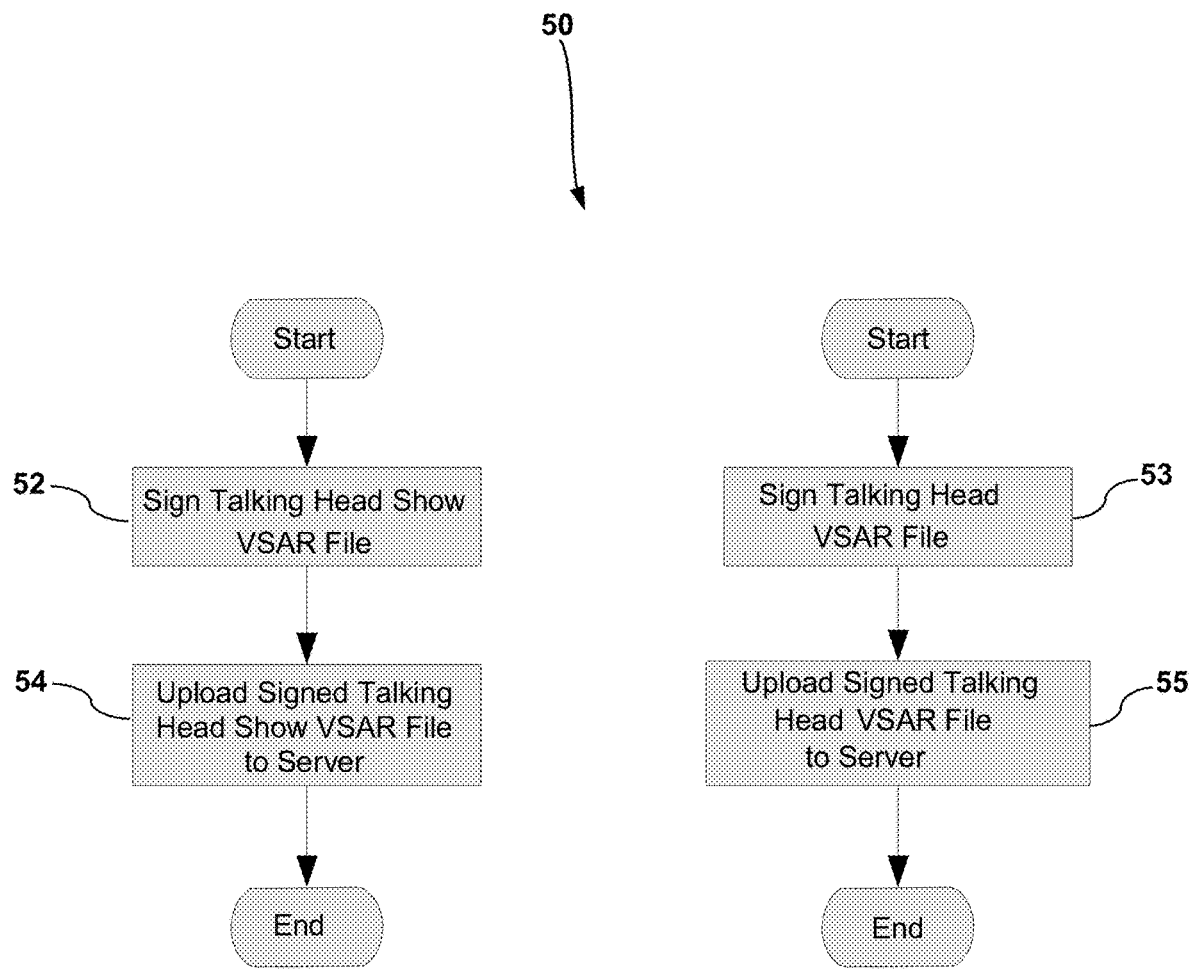
FIG. 3 is another talking head and talking head show publishing flow chart.

FIGS. 2 and 3 show talking head and talking head show publication, in accordance with the present invention.

FIG. 2 is a talking head and talking head show publishing flow chart 40, which shows the steps of: incorporating, at 42 and 43, talking head and talking head show files 26 and 28, respectively, into specially formatted talking head files and specially formatted talking head show files, called vsar files, respectively, which are discussed in more detail, later; calculating, at 44 and 45, hashes of the specially formatted talking head files and the specially formatted talking head show files, respectively; and uploading, at 46 and 47, the hashes of the specially formatted talking head files and the specially formatted talking head show files, respectively, to the blockchain 18.

The talking head files 26 and talking head show files 28 are incorporated into specially formatted files, called vsar files, as mentioned above and which are discussed in more detail, later, although any other suitable file name and/or file format may be used.

In more detail, the talking head and talking head show method 40 of FIG. 2 comprises the steps of:
(steps 42 and 43): incorporating talking head files and talking head show files 26 and 28, respectively, into specially formatted talking head and talking head show files, respectively;
(steps 44 and 45): calculating hashes of the specially formatted talking head files and the specially formatted talking head show files, respectively;
(steps 46 and 47): uploading the hashes of the specially formatted talking head files and the specially formatted talking head show files, respectively, to the blockchain 18.

FIG. 3 is a talking head and talking head show publishing flow chart 50, which shows the process in which the hashed specially formatted talking head file and the hashed specially formatted talking head show file are signed and uploaded to a server, including the steps of: signing, at 52 and 53, the specially formatted talking head files and the specially formatted talking head show files, respectively; and uploading, at 54 and 55, the signed specially formatted talking head files and the signed specially formatted talking head show files to a server, respectively.

In more detail, the talking head and talking head show publishing flow chart 50 of FIG. 3 comprises the steps of:
(steps 52 and 53): signing the specially formatted talking head files and the specially formatted talking head show files, respectively;
(steps 54 and 55): uploading the signed specially formatted talking head files and the signed specially formatted talking head show files to a server, respectively.

FIGS. 4-7 show talking head and talking head show playback verification, in accordance with the present invention.

Figure 4:
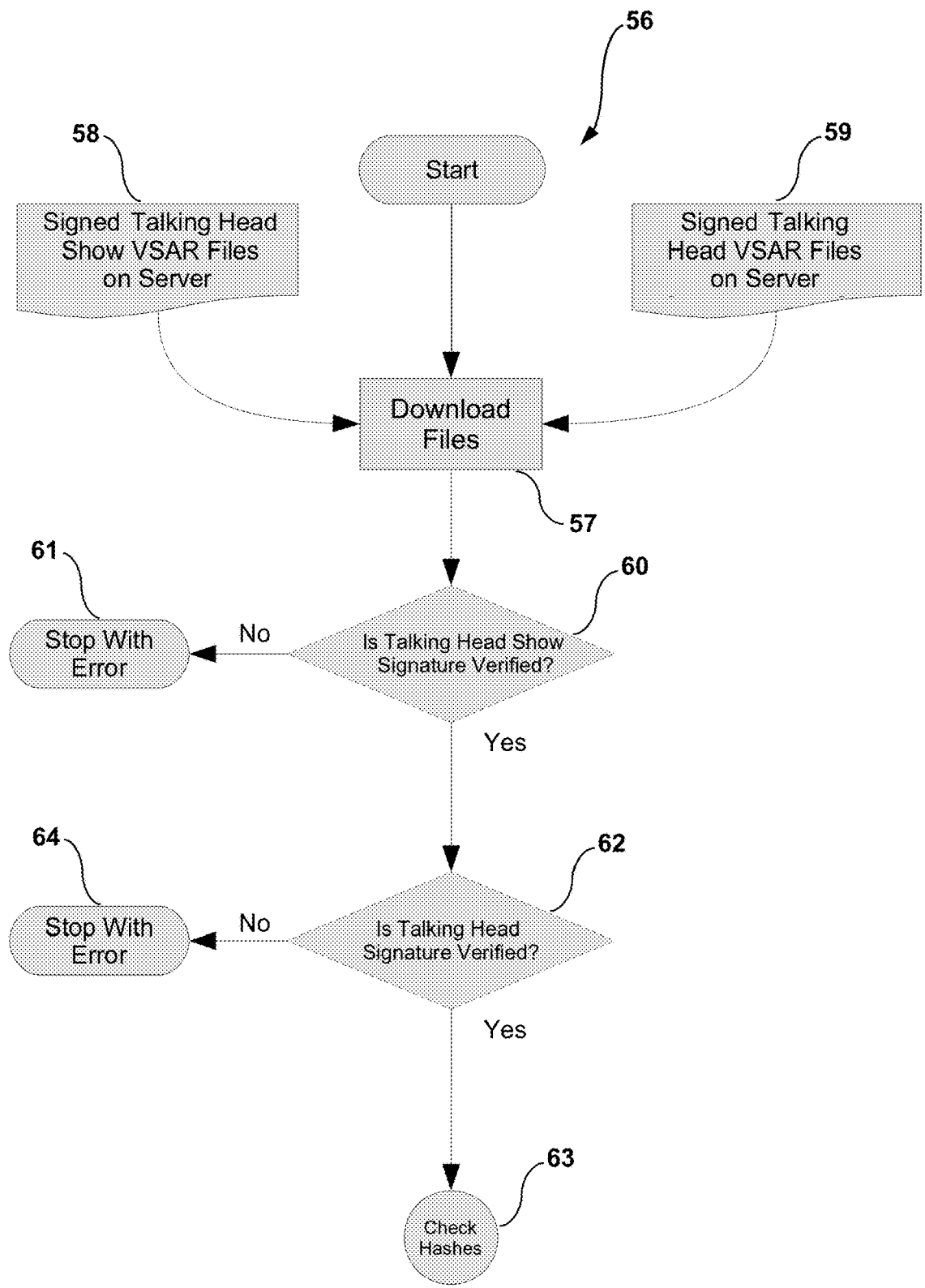
FIG. 4 is a talking head and talking head show playback verification flow chart.

FIG. 4 is a talking head and talking head show playback verification flow chart 56, which shows the process of downloading the specially formatted and signed talking head files and talking head show files, and verifying the specially formatted and signed talking head files and talking head show files, including the steps of: downloading, at 57, the signed specially formatted talking head show files 58 and the signed specially formatted talking head files 59 from the server, respectively; and if the signature of the downloaded signed specially formatted talking head show files 58 is verified to be correct at step 60, then playback verification continues; otherwise, playback verification stops with an error at step 61.

Figure 5:
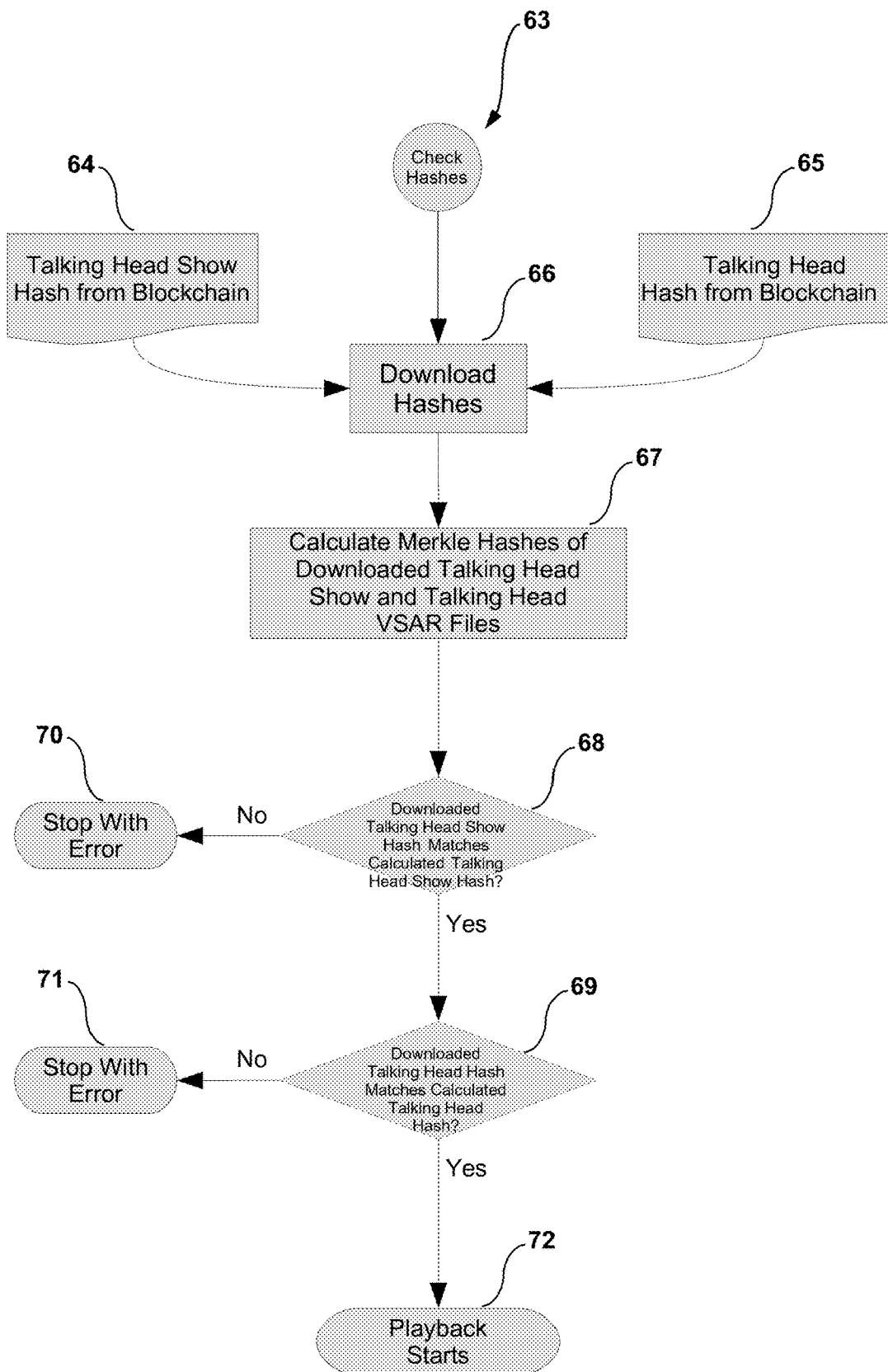
FIG. 5 is a talking head and talking head show playback verification flow chart, which is a continuation of FIG. 4.

If playback verification continues, and if the signature of the downloaded signed specially formatted talking head files 59 is verified to be correct at step 62, then hashes are checked at 63; otherwise, playback verification stops with an error at step 64;

FIG. 5 is a talking head and talking head show playback verification flow chart 63, which is a continuation of FIG. 4, which shows the hashes being checked. The talking head show hash and talking head hash 64 and 65, respectively, are downloaded, at 66, from the blockchain 18; Merkle hashes of the downloaded talking head show specially formatted files 58 and the downloaded talking head specially formatted files 59, each from step 57, are calculated at step 67.

The calculated hash of the talking head show specially formatted files 58 downloaded from the server is checked, at step 68, against the talking head show hash 64 downloaded from the blockchain 18; and if the hash calculated at step 67 of the talking head show specially formatted files 58 downloaded from the server matches the talking head show hash 64 downloaded from the blockchain 18, then playback verification continues to step 69; otherwise, playback verification stops with an error at step 70.

The calculated hash of the talking head specially formatted files 59 downloaded from the server is checked, at step 69, against the talking head hash 65 downloaded from the blockchain 18; and if the hash calculated at step 67 of the talking head specially formatted files 59 downloaded from the server matches the talking head hash 65 downloaded from the blockchain 18, then playback starts at step 72; otherwise, playback verification stops with an error at step 71.

Figure 6:
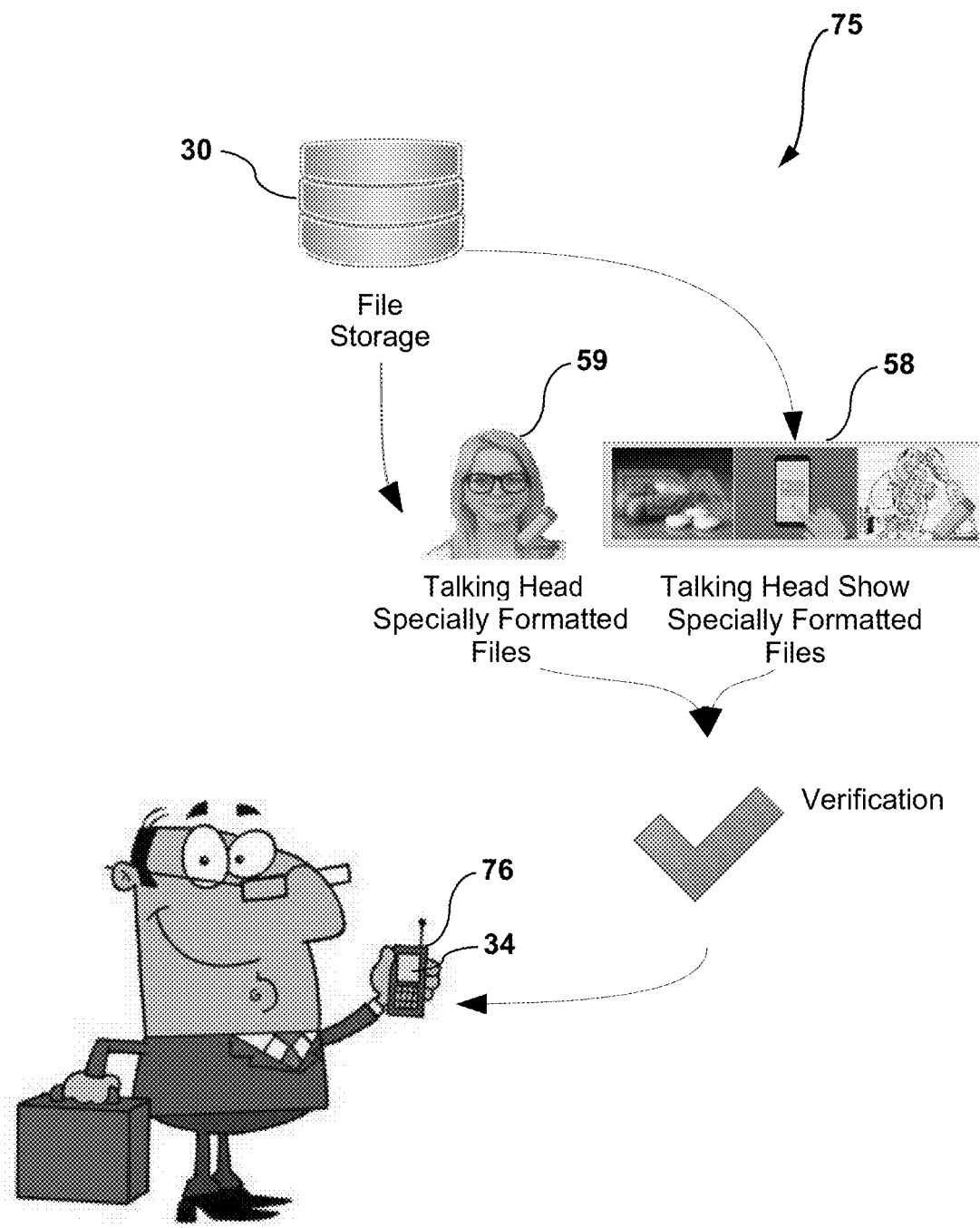
FIG. 6 is a schematic representation of talking head and talking head show verification.

FIG. 6 is a schematic representation of talking head and talking head show verification 75, which shows verification of talking head show specially formatted files 58 and talking head specially formatted files 59 after being downloaded, hashed, and verified. In this instance, playback 34 is shown on a cell phone 76, however, any suitable device may be used for playback 34.

Figure 7:
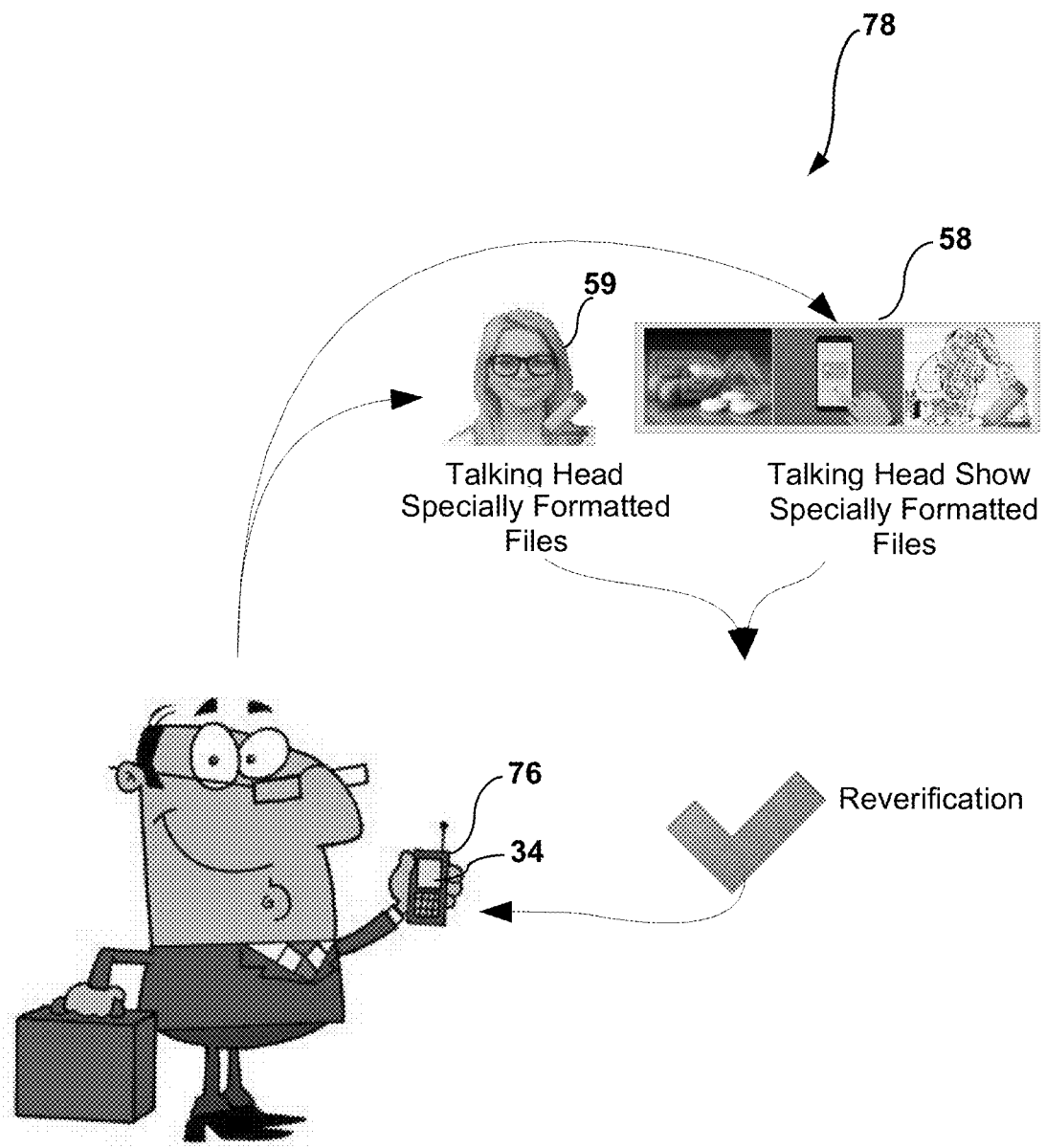
FIG. 7 is a schematic representation of talking head and talking head show reverification.

FIG. 7 is a schematic representation of talking head and talking head show reverification 78. Reverification 78 of the talking head show specially formatted files 58 and the talking head specially formatted files 59, each cached on a user's cell phone 76 or other suitable device, may take place at a user's request automatically, either when the cell phone 76 or other suitable device is idle or at another suitable time.

Figure 8:
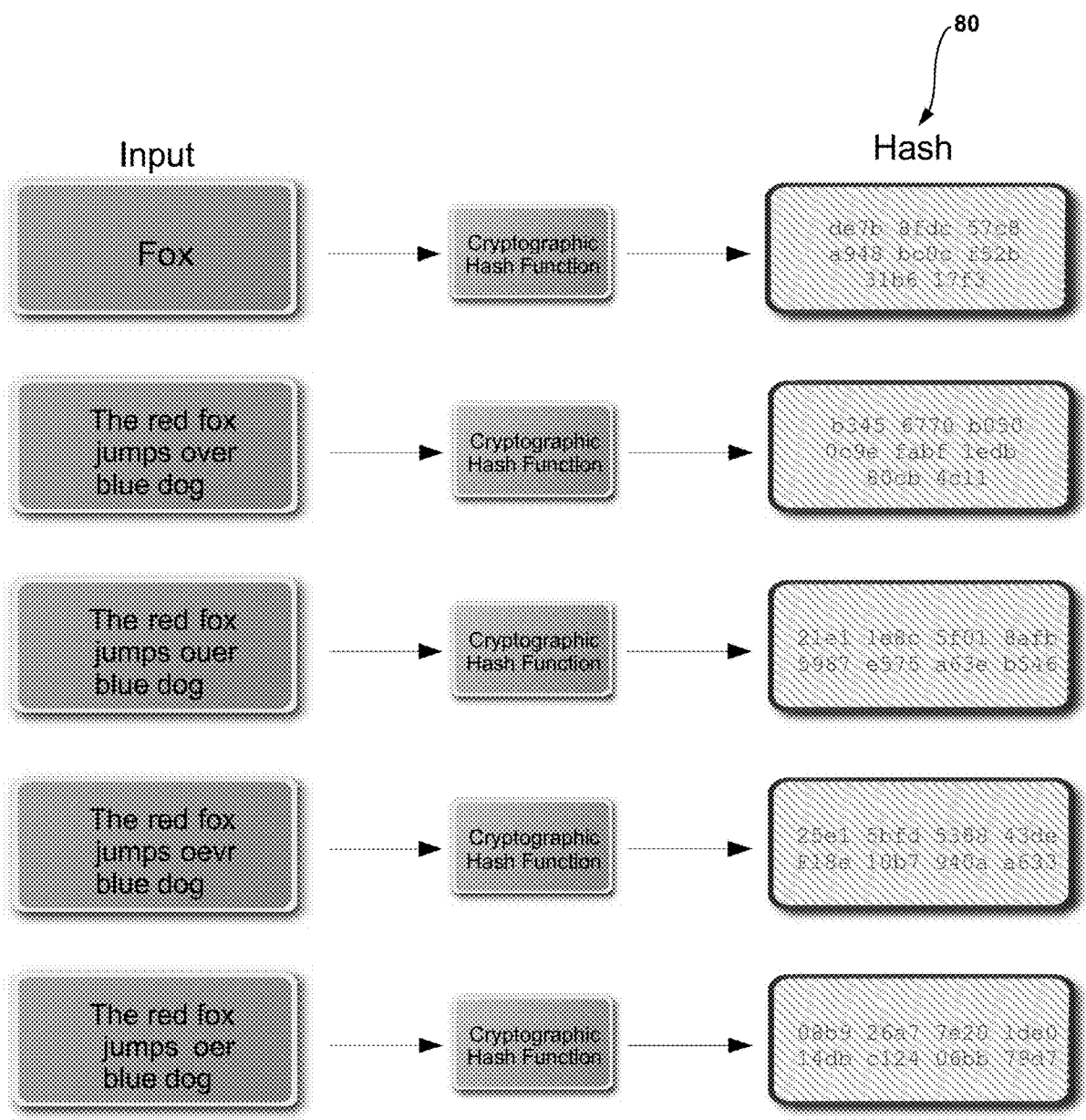
FIG. 8 is a schematic representation of cryptographic hash codes of different inputs.
Figure 9:
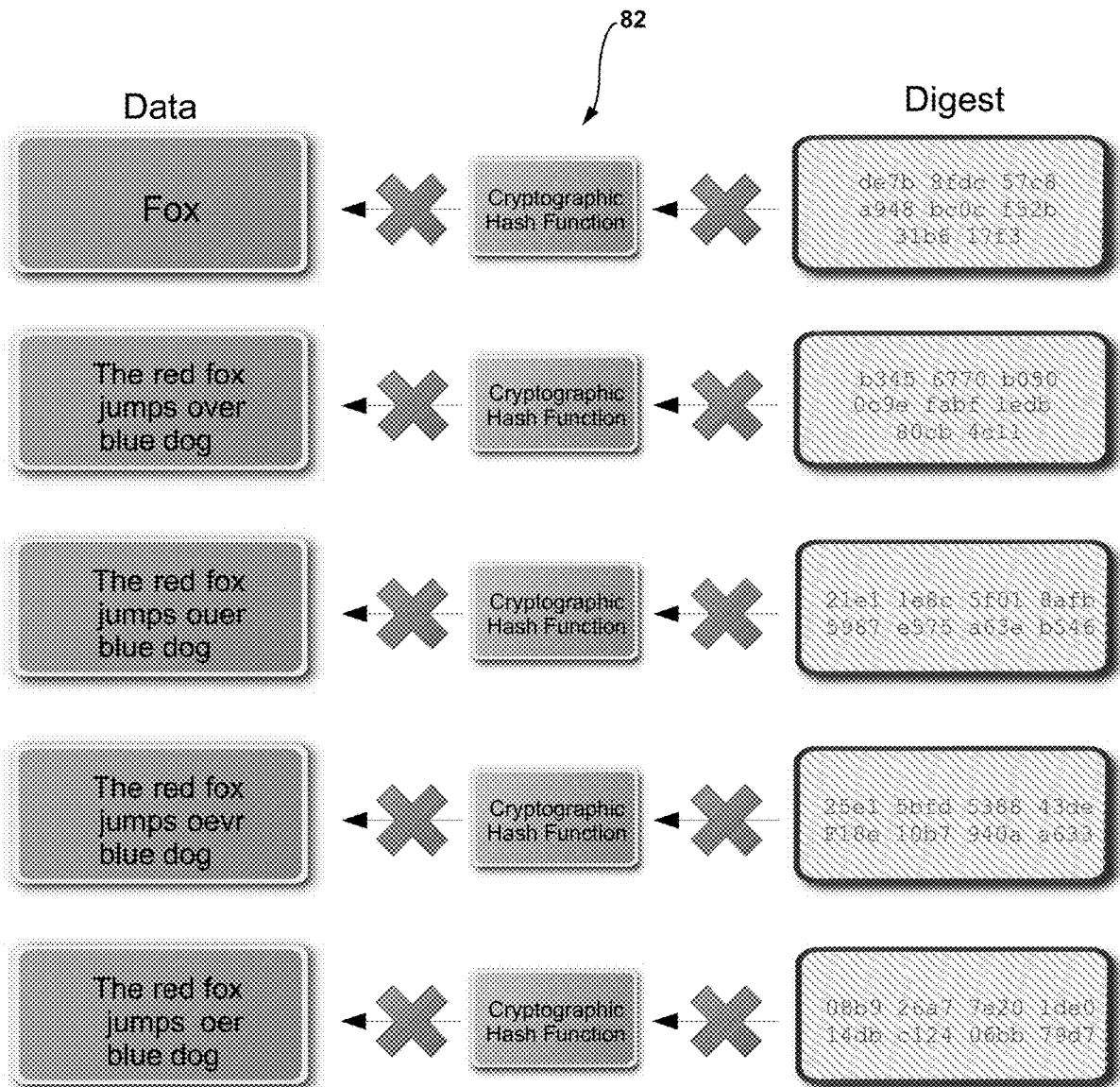
FIG. 9 is a schematic representation of non reversibility of cryptographic hash codes.

FIGS. 8 and 9 discuss cryptographic hash functions.

FIG. 8 is a schematic representation of cryptographic hash codes 80 for different inputs and resulting hashes for each of the different inputs. FIG. 8 shows that different inputs result in different hashes. Data input into a hash function generates a string of characters unique to the data, which are one way hashes, each generating a unique hash for a different input. A hash is typically a string of characters generated by a formula.

FIG. 9 is a schematic representation of non reversibility of cryptographic hash functions 82. A cryptographic hash function converts input data into a unique hash, but cannot convert the unique hash back into the original input data.

Blockchain is a shared, immutable ledger that facilitates the process of recording transactions and tracking assets in a business network. An asset can be tangible (a house, car, cash, land) or intangible (intellectual property, patents, copyrights, branding). Virtually anything of value can be tracked and traded on a blockchain network, reducing risk and cutting costs for all involved.

Figure 10:
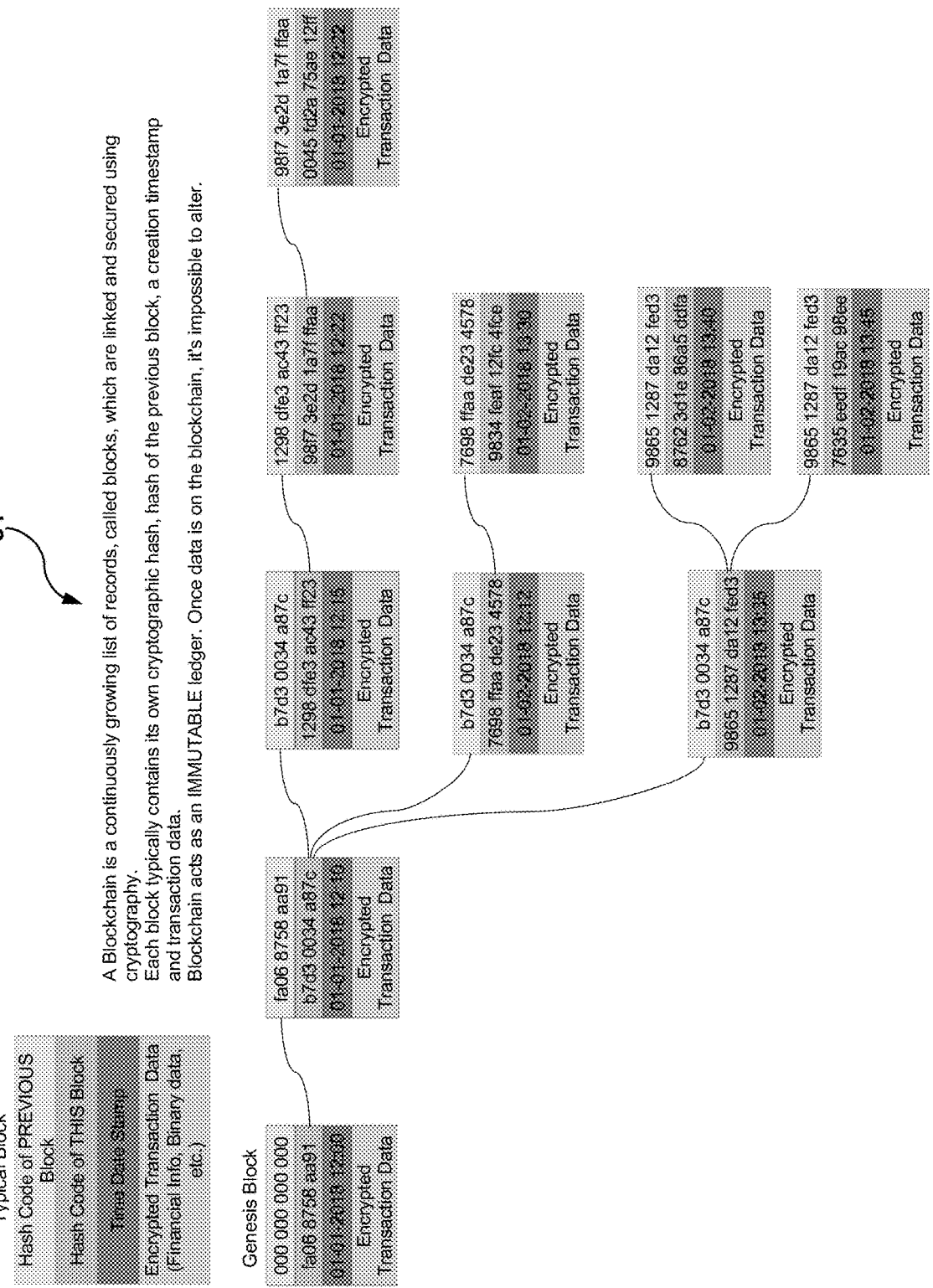
FIG. 10 is a schematic representation of formation of a blockchain.
Figure 11:
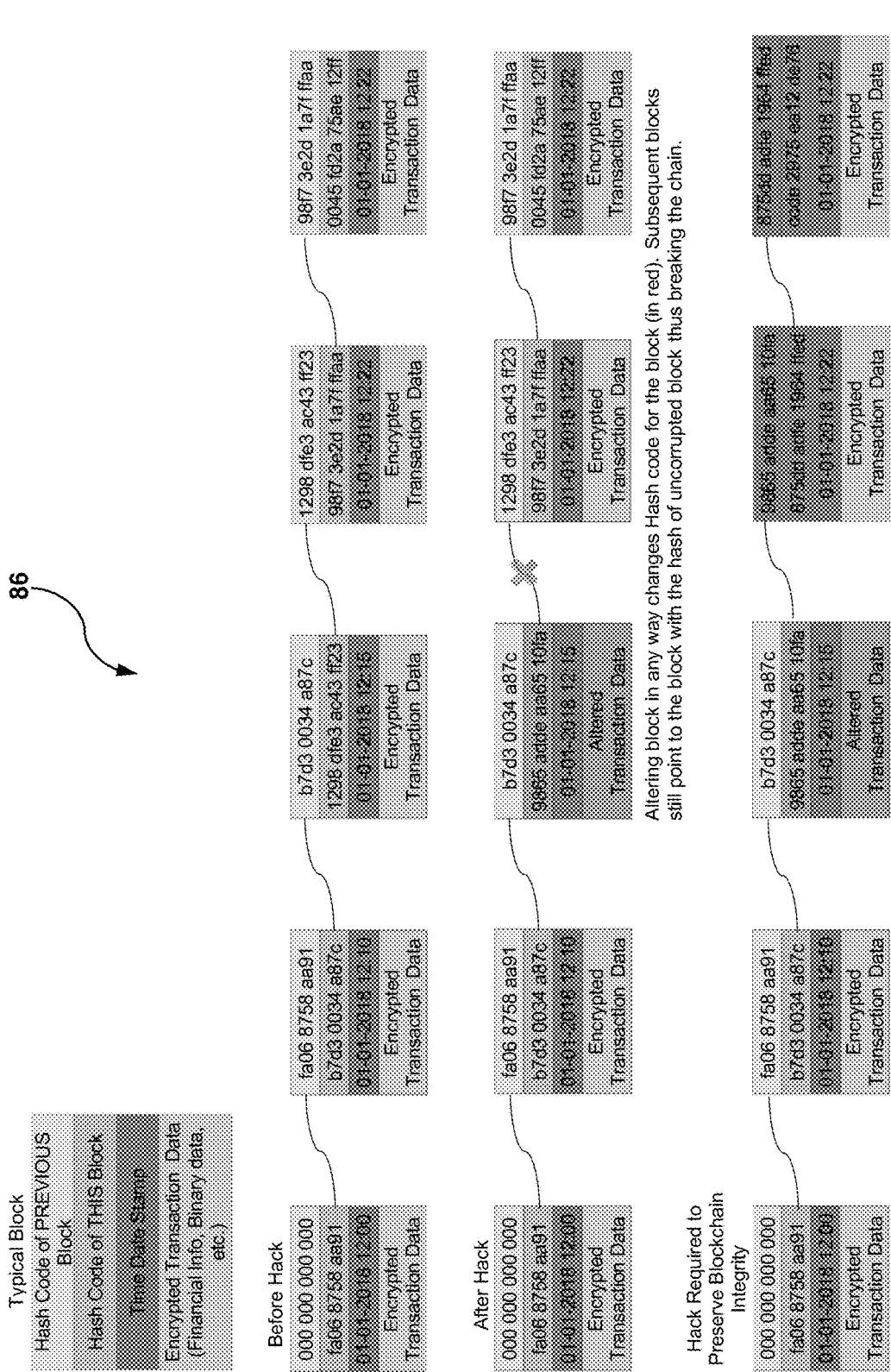
FIG. 11 is a schematic representation of blockchain security.

FIGS. 10 and 11 discuss blockchain and blockchain security, respectively.

FIG. 10 is a schematic representation of formation of a blockchain 84. A blockchain is a growing list of records, called blocks, which are linked together using cryptography. Each block contains a cryptographic hash of the previous block, a timestamp, and transaction data (generally represented as a Merkle tree). The timestamp proves that the transaction data existed when the block was published in order to get into its hash. As blocks each contain information about the block previous to it, the contiguous blocks form a chain, with each additional block reinforcing the blocks before it. Once recorded, the data in any given block cannot be altered retroactively, without altering all subsequent blocks. Blockchains are, thus, resistant to modification of their data.

FIG. 11 is a schematic representation of blockchain security 86, and shows a blockchain before and after an attempted hack. Blocks have certain storage capacities and, when filled, are closed and linked to the previously filled block, forming a chain of data known as the "blockchain." All new information that follows that freshly added block is compiled into a newly formed block that will then also be added to the chain once filled. Altering any block in any way in the blockchain changes the hash code for the block (in red). Subsequent blocks still point to the block with the hash of the uncorrupted block, thus, breaking the chain. To hack the blockchain, a hacker would have to hack all blocks that follow the corrupted block in the blockchain.

While blockchain has been touted as virtually "unhackable," it's important to remember that most blockchain transactions have endpoints that are far less secure. Blockchain security is further addressed here with the addition of additional authentication, discussed, later.

Figure 12:
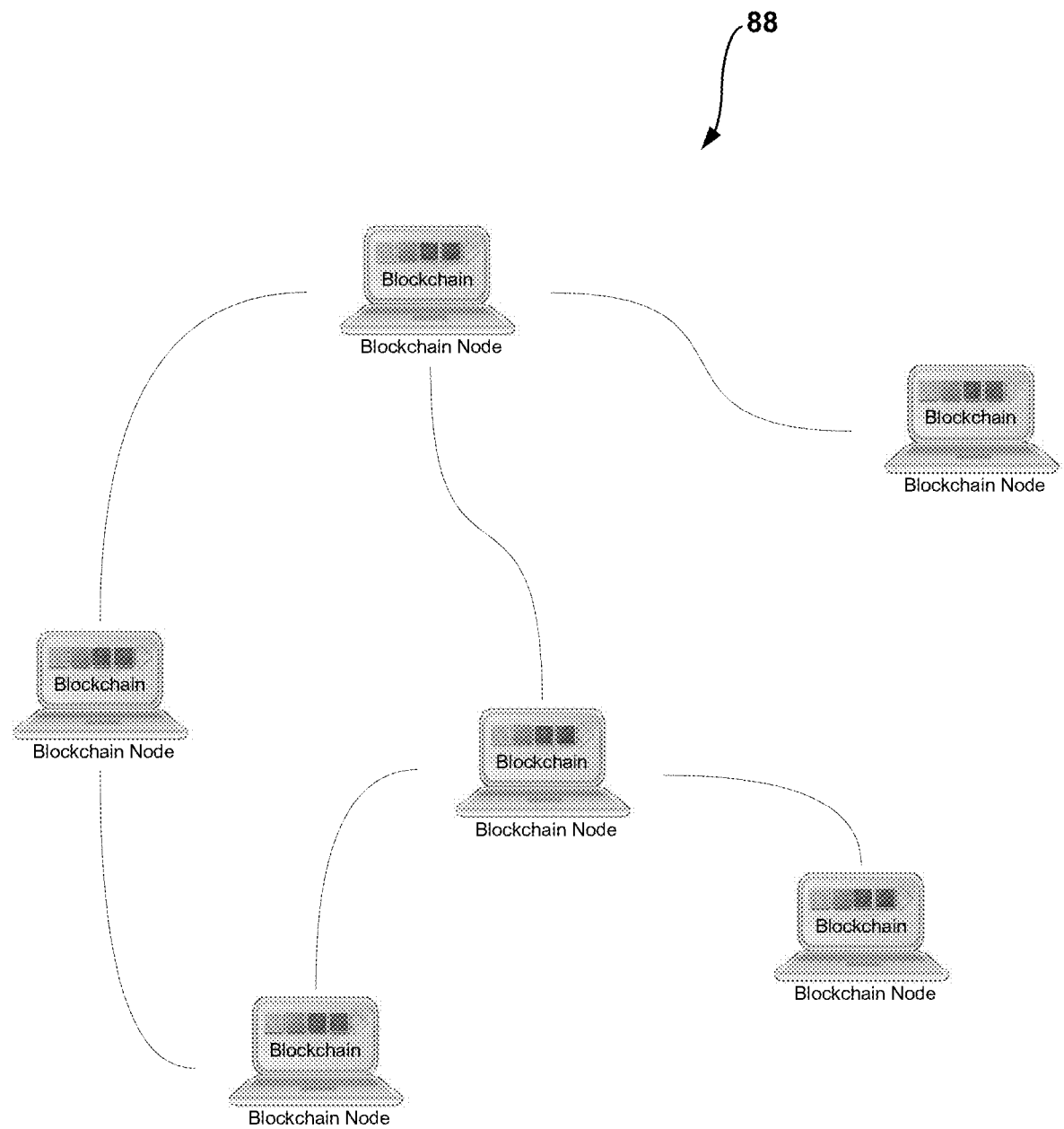
FIG. 12 is a schematic representation of blockchain peer to peer networking.
Figure 13:
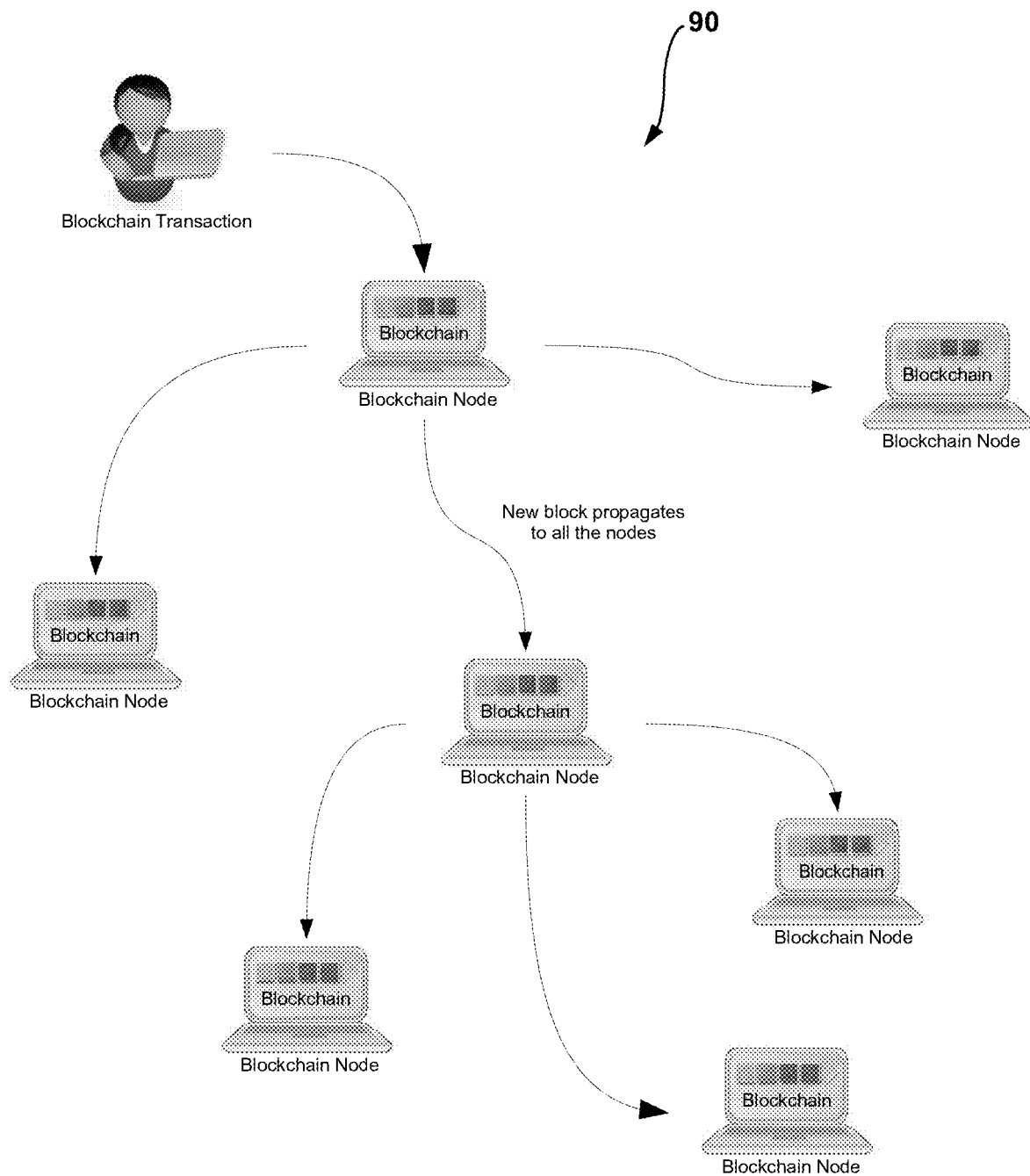
FIG. 13 is a schematic representation of blockchain peer to peer networking showing a blockchain transaction.
Figure 14:
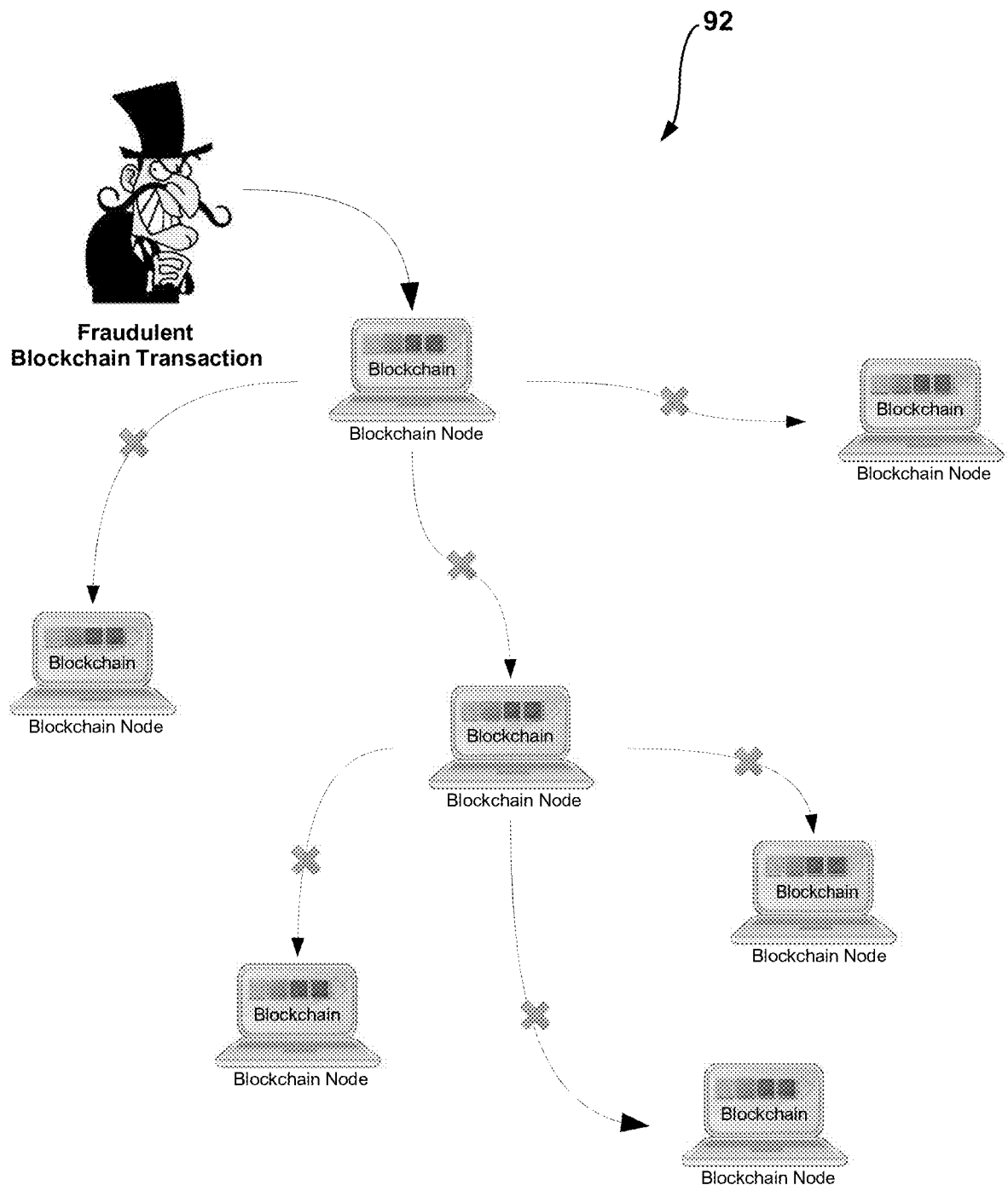
FIG. 14 is a schematic representation of blockchain peer to peer networking showing a fraudulent blockchain transaction.

FIGS. 12-14 discuss blockchain peer to peer networking.

FIG. 12 is a schematic representation of a blockchain using a peer to peer networking architecture 88. Blockchains are typically managed by a peer-to-peer network for use as a publicly distributed ledger, where nodes collectively adhere to a protocol to communicate and validate new blocks.

Peer-to-peer computing or networking is a distributed application architecture that partitions tasks or workloads between peers. Peers are equally privileged, equipotent participants in the application. The peers are said to form a peer-to-peer network of nodes, which are either redistribution points or communication endpoints, and may be machines or electronic devices that are attached to a network, and are capable of creating, receiving, or transmitting information over a communication channel.

In the peer to peer networking architecture, shown in FIG. 12, each node has a copy of the blockchain and checks transactions on all other nodes.

FIG. 13 is a schematic representation, which shows that when a blockchain transaction is performed at one of the nodes, a new block is created, which propagates to all the nodes in the peer to peer network 90. The node where the transaction is performed sends a new block to the next node, which updates the blockchain. That node, in turn, sends the new block to the next node, and so on. Ultimately, all the nodes have a copy of the new block.

FIG. 14 is a schematic representation, which shows that since all nodes have a copy of the blockchain, all nodes must agree that a transaction is valid 92. If a fraudulent blockchain transaction is performed and a fraudulent block is created, the nodes reject the fraudulent block. To make a blockchain harder to hack, a random element is added during new block creation.

FIG. 15 shows that crypto mining comprises adding transactions to an existing blockchain ledger of transactions, which is distributed among all users of a blockchain 94, and discusses blockchain mining and proof of work. In mining, a hash of a block of transactions is created that cannot be easily forged, which protects the integrity of an entire blockchain without the need of a central system.

In order to secure a blockchain, a consensus protocol called "proof of work" is used. In the proof of work protocol, all the nodes on the network agree on the state of information in the process of "mining, which is directed to prevent economic attacks.

Blockchain mining comprises adding transactions to an existing blockchain ledger of transactions distributed among all users of a blockchain. While mining is mostly associated with bitcoin, other technologies using a blockchain also employ mining. Mining includes creating a hash of a block of transactions that cannot be easily forged, thus, protecting the integrity of the entire blockchain without the need for a central system.

Cryptocurrency mining is somewhat similar to mining precious metals. While miners of precious metals unearth the precious metals, crypto miners trigger the release of new coins into circulation. For miners to be rewarded with new coins, the miners deploy machines that solve complex mathematical equations in the form of cryptographic hashes. A hash is a truncated digital signature of a chunk of data. Hashes are generated to secure data transferred on a public network. Miners compete with their peers to zero in on a hash value generated by a crypto coin transaction, and the first miner to crack the code gets to add the block to the ledger and receive the reward.

Each block uses a hash function to refer to the previous block, forming an unbroken chain of blocks that leads back to the first block. For this reason, peers on the network can easily verify whether certain blocks are valid and whether the miners who validated each block properly solved the hash to receive the reward.

The mining process involves computing a hash of a number called a nonce, which is an abbreviation for a number only used once. The nonce is an arbitrary number that is used just once in a cryptographic communication and is often a random or pseudo-random number issued in an authentication protocol to ensure that old communications cannot be reused in replay attacks.

FIG. 16 shows that adding nonces to a blockchain makes block creation arduous work 96. The goal is to find the nonce that yields a hash with a specified "difficulty", i.e., the required number of leading zeroes, which is a measure of how difficult it is to mine a cryptocurrency block, or in more technical terms, to find a hash below a given target. A high difficulty means that it will take more computing power to mine the same number of blocks, making the network more secure against attacks.

No advanced math or computation is really involved. What miners are actually doing is trying to be the first miner to come up with a 64-digit hexadecimal number (a "hash") that is less than or equal to the target hash, which is basically guesswork Mining is a matter of guesswork or randomness, but with the total number of possible guesses for each of these problems being in the order of trillions, mining is incredibly arduous work. The number of possible solutions only increases the more miners that join the mining network (known as the mining difficulty). In order to solve a problem first, miners need significant computing power. To mine successfully, the miner needs to have a high "hash rate," which is measured in terms gigahashes per second (GH/s) and terahashes per second (TH/s).

Figure 17:
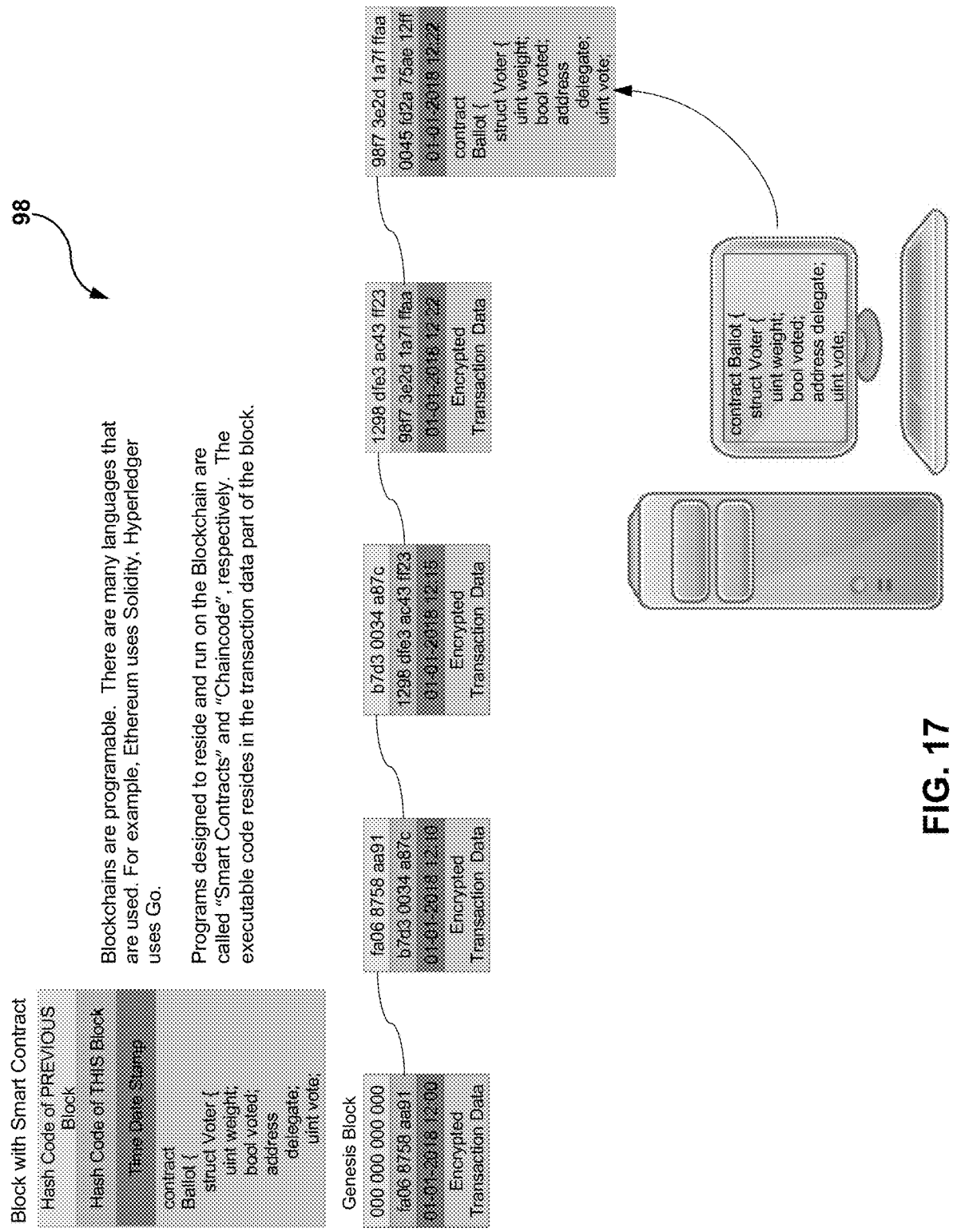
FIG. 17 is a schematic representation showing that blockchains are programmable.
Figure 18:
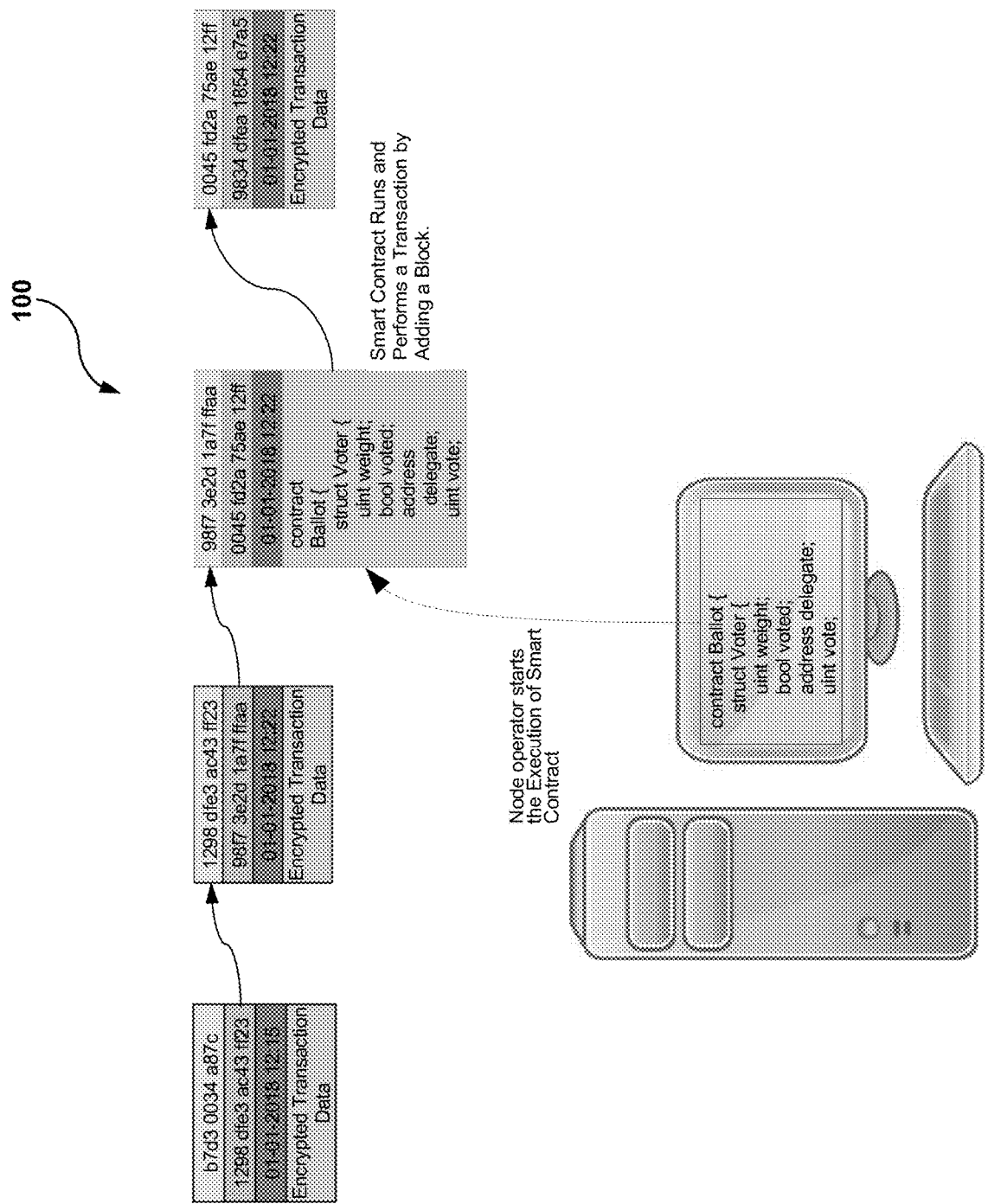
FIG. 18 is a schematic representation showing that smart contracts can perform transactions by adding blocks to the blockchain.
Figure 19:
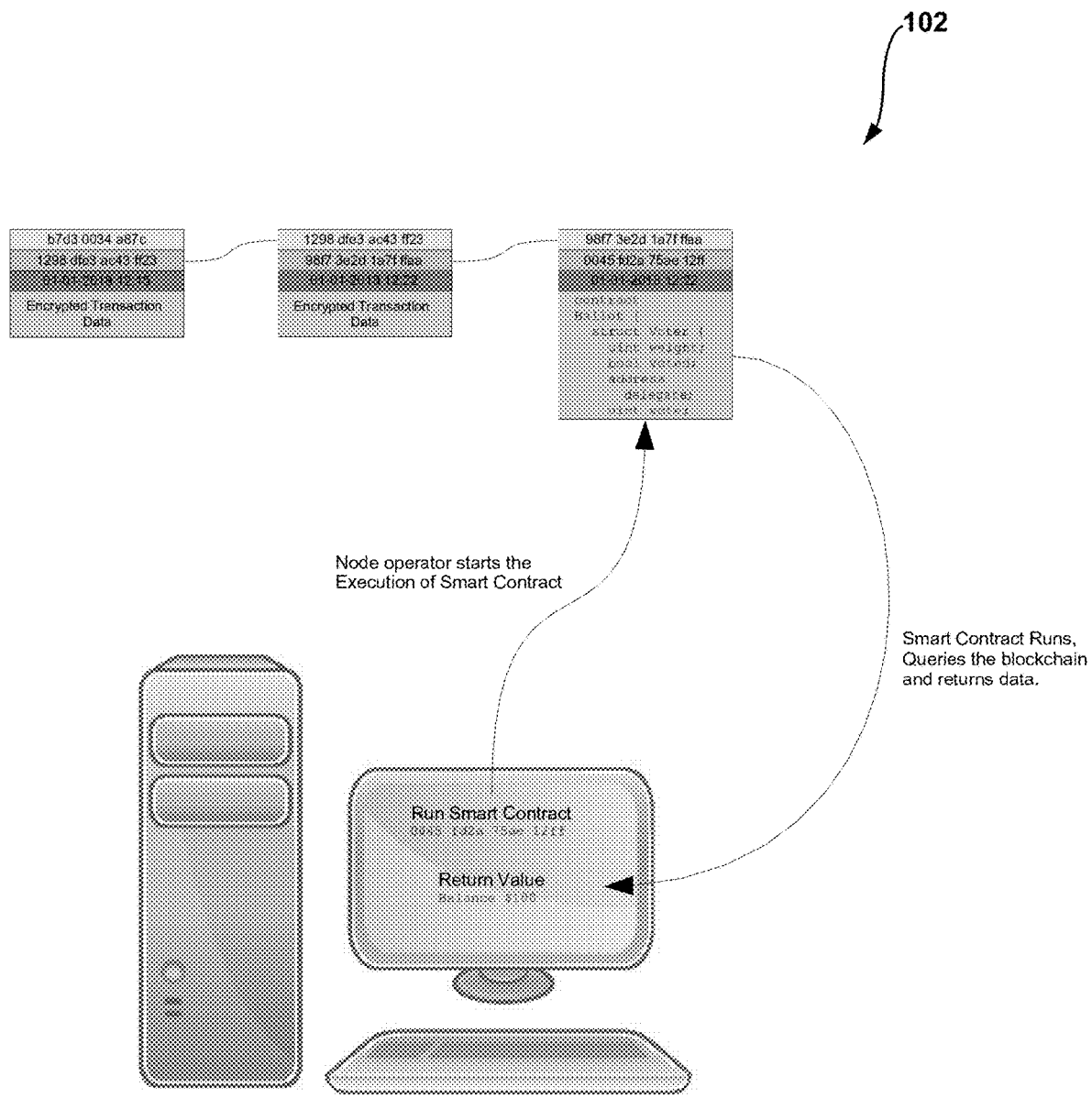
FIG. 19 is a schematic representation showing that smart contracts can query a blockchain and return data.

FIGS. 17-19 show that a blockchain is programmable.

FIG. 17 shows that a blockchain is programmable 98. To get the benefits of blockchain, programmability is necessary. There are many types of transactions that can be written to the blockchain with full programmability. In fact, it is completely up to the user. Users can create their own types of transactions that correspond to programs, which are called smart contracts and chain code. Smart contacts run on programmable blockchains. These programs enable complex deals, for example, ensuring that person A paid money, person B did his part, person C did her part, and everyone agrees. It's this level of flexibility that gives programmable blockchain its power, and that enables us to realize the greatest benefits. The executable code resides in the transaction data part of the block.

Smart contracts are developed and tested locally on local machines and PC's. Once the smart contract is developed and debugged, it is sent to the blockchain.

FIG. 18 shows that smart contracts can perform transactions by adding blocks to the blockchain 100.

FIG. 19 shows that smart contracts can query a blockchain and return data 102.

Figure 20:
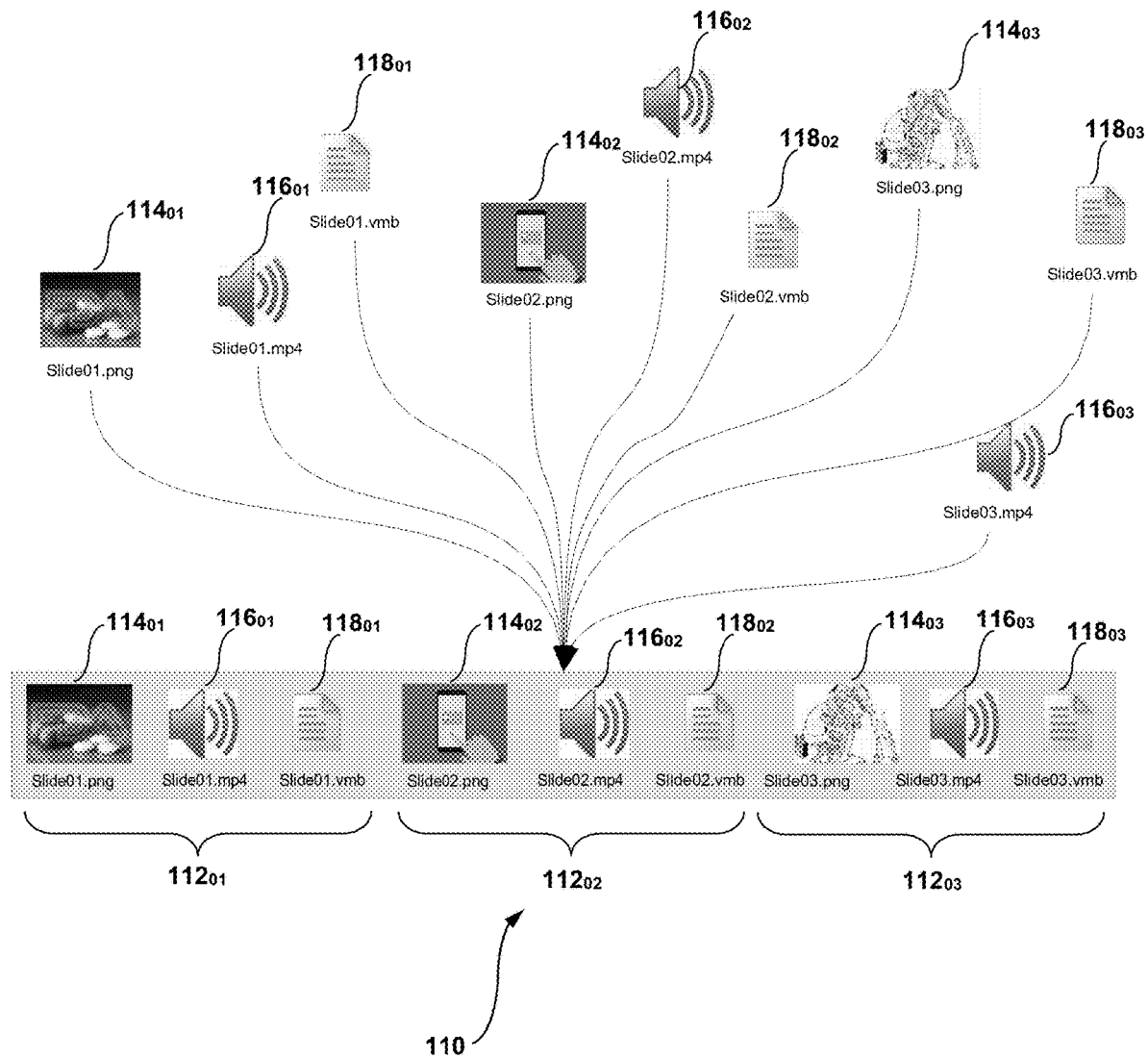
FIG. 20 is a schematic representation showing contents of a specially formatted file for storing talking heads and talking head shows, constructed in accordance with the present invention.
Figure 21:
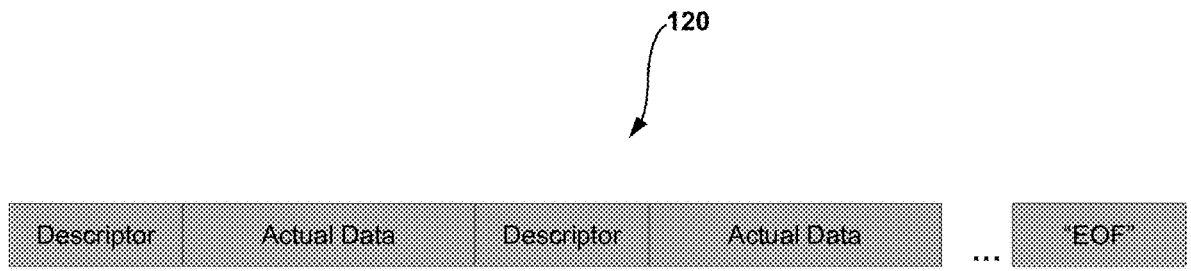
FIG. 21 is a schematic representation of the specially formatted files of FIG. 20.

FIGS. 20 and 21 show a specially formatted file and specially formatted file format for use with talking heads and talking head shows, respectively, in accordance with the present invention.

FIG. 20 is a schematic representation showing contents of a talking head show specially formatted file 110, constructed in accordance with the present invention, the format of which may be used for storing talking head files and talking head show files 26 and 28, respectively. The talking head show specially formatted file 110 is shown as a vsar file in which all files associated with a talking head show 14 are incorporated into one file having both header and metadata information, although any other suitable file name may be used having the aforementioned attributes.

The format of the talking head show specially formatted file 110 may be used to store talking head show files 28, shown and discussed in more detail, later, as a talking head show specially formatted file, and/or talking head files 26, also shown and discussed in more detail, later, as a talking head show specially formatted file 110.

Each talking head show specially formatted file 110 of FIG. 20 comprises a plurality of images and/or slide files, a plurality of audio files, and a plurality of header and/or metadata files, which follow the format and syntax $112_{01}$, $112_{02}$, and $112_{03}$, and so on, respectively; each of which comprises at least one image or slide file, which follow the format and syntax $114_{01}$, $114_{02}$, and $114_{03}$, and so on, respectively, a plurality of audio files, which follow the format and syntax $116_{01}$, $116_{02}$, and $116_{03}$, and so on, respectively, and a plurality of header and/or metadata files, which follow the format and syntax $118_{01}$, $118_{02}$, and $118_{03}$, and so on, respectively. Other suitable files may also be included. The talking head show specially formatted files 110 of FIG. 20 are typically retrieved sequentially; however, other suitable file retrieval methods may be used.

The talking head show specially formatted file 110 of FIG. 20 is shown as a vsar file in which all files associated with the talking head show 14 are incorporated into one file having both header and metadata information, although any other suitable file name may be used having the aforementioned attributes. The specially formatted file may be used to store talking heads and/or talking head shows.

FIG. 21 is a schematic representation, which shows the format and syntax of descriptors of a specially formatted talking head show file 120. FIG. 21 shows descriptors that are incorporated into the specially formatted file. Each descriptor is shown as a string of variable length having a format, comprising: length of file|file name|additional data||. The length of file, file name, and additional data in each of the descriptors are separated with a pipe character, and each descriptor is terminated with a double pipe characters, as shown.

Figure 22:
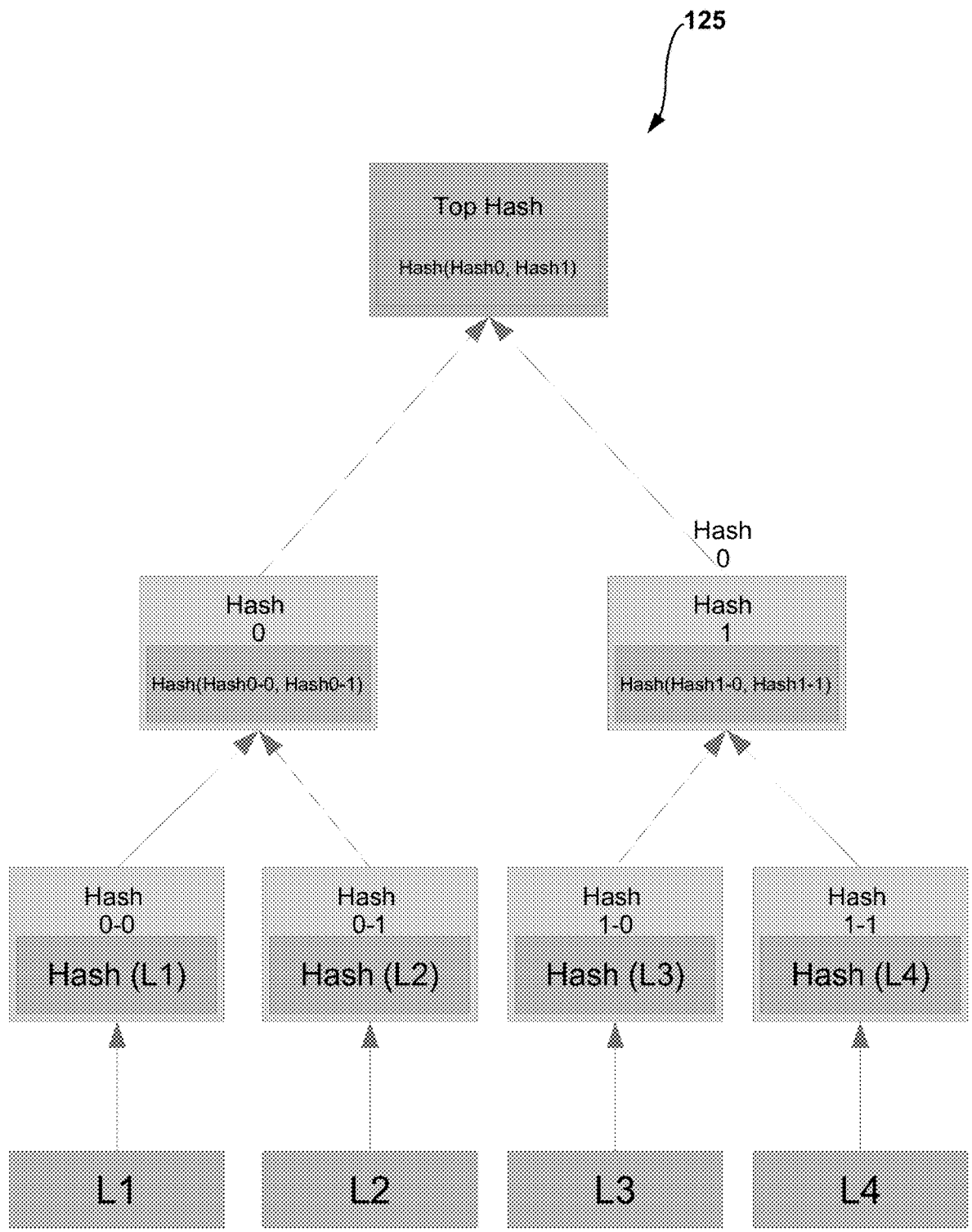
FIG. 22 is a schematic representation of a Merkle tree.

FIG. 22 discusses a Merkle tree.

FIG. 22 is a schematic representation of a Merkle tree 125, which is a data structure that is used in computer science applications. In bitcoin and other cryptocurrencies, Merkle trees serve to encode blockchain data more efficiently and securely. Merkle trees are also referred to as "binary hash trees."

In bitcoin's blockchain, a block of transactions is run through an algorithm to generate a hash, which is a string of numbers and letters that can be used to verify that a given set of data is the same as the original set of transactions, but not to obtain the original set of transactions. Bitcoin's software does not run the entire block of transaction data—representing 10 minutes' worth of transactions on average—through the hash function at one time, however. Rather, each transaction is hashed, then each pair of transactions is concatenated and hashed together, and so on until there is one hash for the entire block. (If there is an odd number of transactions, one transaction is doubled, and its hash is concatenated with itself.)

Visualized, this structure resembles a tree. The hashes on the bottom row are referred to as "leaves," the intermediate hashes as "branches," and the hash at the top as the "root."

The Merkle root of a given block is stored in the header. The Merkle root is combined with other information (the software version, the previous block's hash, the timestamp, the difficulty target, and the nonce) and then run through a hash function to produce the block's unique hash. This hash is not actually included in the relevant block, but the next one; it is distinct from the Merkle root.

The Merkle tree is useful, because it allows users to verify a specific transaction without downloading the entire blockchain (over 350 gigabytes at the end of June 2021). The Merkle tree allows a user to verify that everything is accounted for with just three hashes and the root hash; HD (the only missing hash) has to be present in the data.

FIGS. 23-26 show components of a talking head, a talking head Merkle tree, and a talking head show Merkle tree, hashing of components of the talking head and talking head show, storage in a specially formatted file, and storing the hashed components of the talking head and talking head show in a blockchain with a smart contract transaction.

Figure 23:
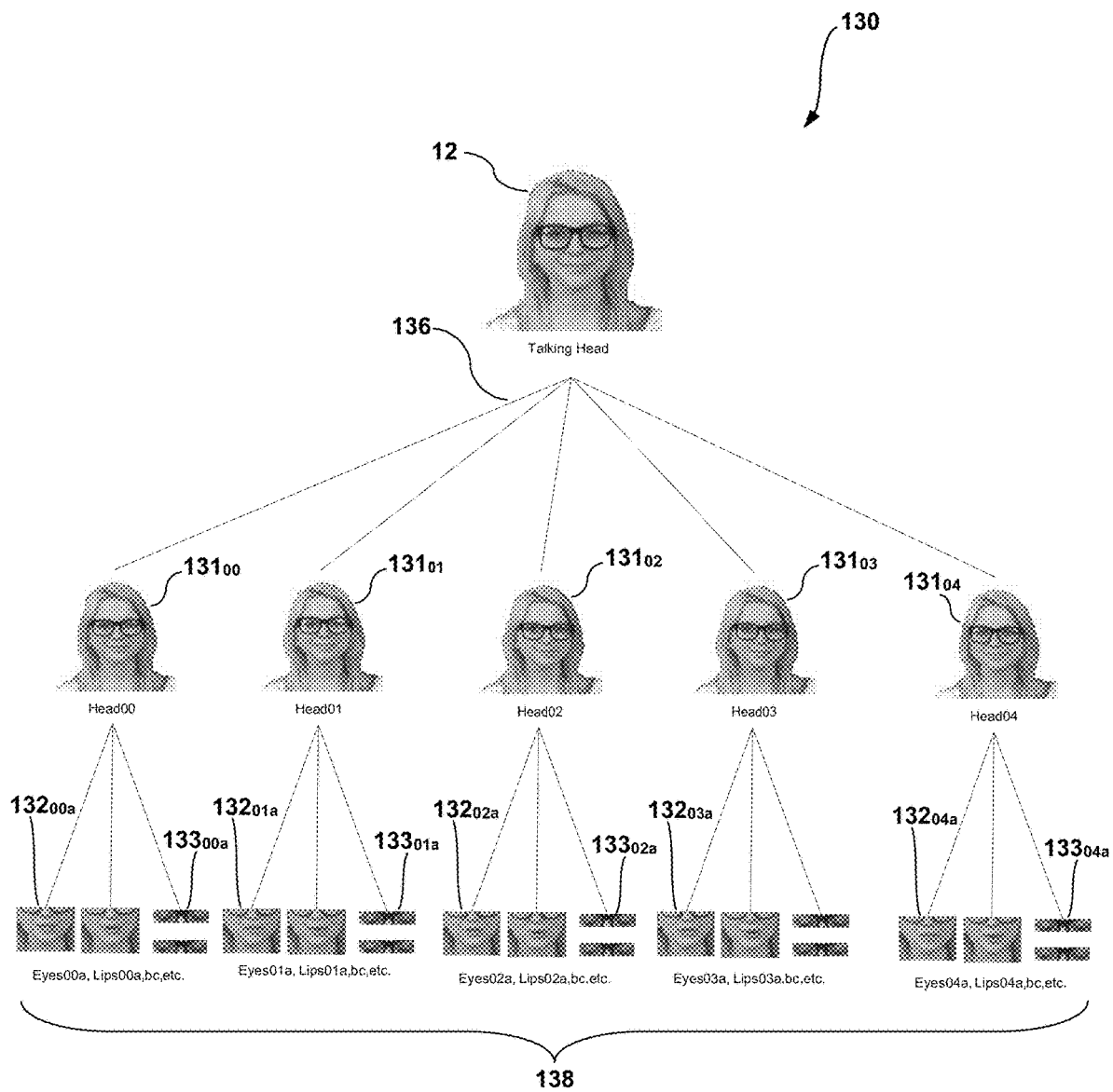
FIG. 23 is a schematic representation of a talking head, which is shown as a bitmap stack.

FIG. 23 is a schematic representation of a talking head 12, which is shown as a bitmap stack 130, comprising different head bitmaps, which follow the format and syntax $131_{00}$, $131_{01}$, $131_{02}$, $131_{03}$, and $131_{04}$, and so on, each of which have different lip bitmaps, which follow the format and syntax $132_{00a}$, $132_{01a}$, $132_{02a}$, $132_{03a}$, and $132_{04a}$, and so on, respectively, and different eye bitmaps which follow the format and syntax $133_{00a}$, $133_{01a}$, $133_{02a}$, $133_{03a}$, and $133_{04a}$, and so on, respectively, the structure of which is similar to a tree 136, all stored in a talking head specially formatted file 138.

A talking head 12, then, comprises a bitmap stack 130, comprising different head bitmaps, which follow the format and syntax $131_{00}$, $131_{01}$, $131_{02}$, $131_{03}$, and $131_{04}$, and so on, each of which have different lip bitmaps, which follow the format and syntax $132_{00a}$, $132_{01a}$, $132_{02a}$, $132_{03a}$, and $132_{04a}$, and so on, respectively, and different eye bitmaps which follow the format and syntax $133_{00a}$, $133_{01a}$, $133_{02a}$, $133_{03a}$, and $133_{04a}$, and so on, respectively, the structure of which is similar to a tree 136, all stored in a talking head specially formatted file 138. Metadata is also stored in the specially formatted file. In this instance, the specially formatted file is named a vsar file, although other suitable file names may be used.

Figure 24:
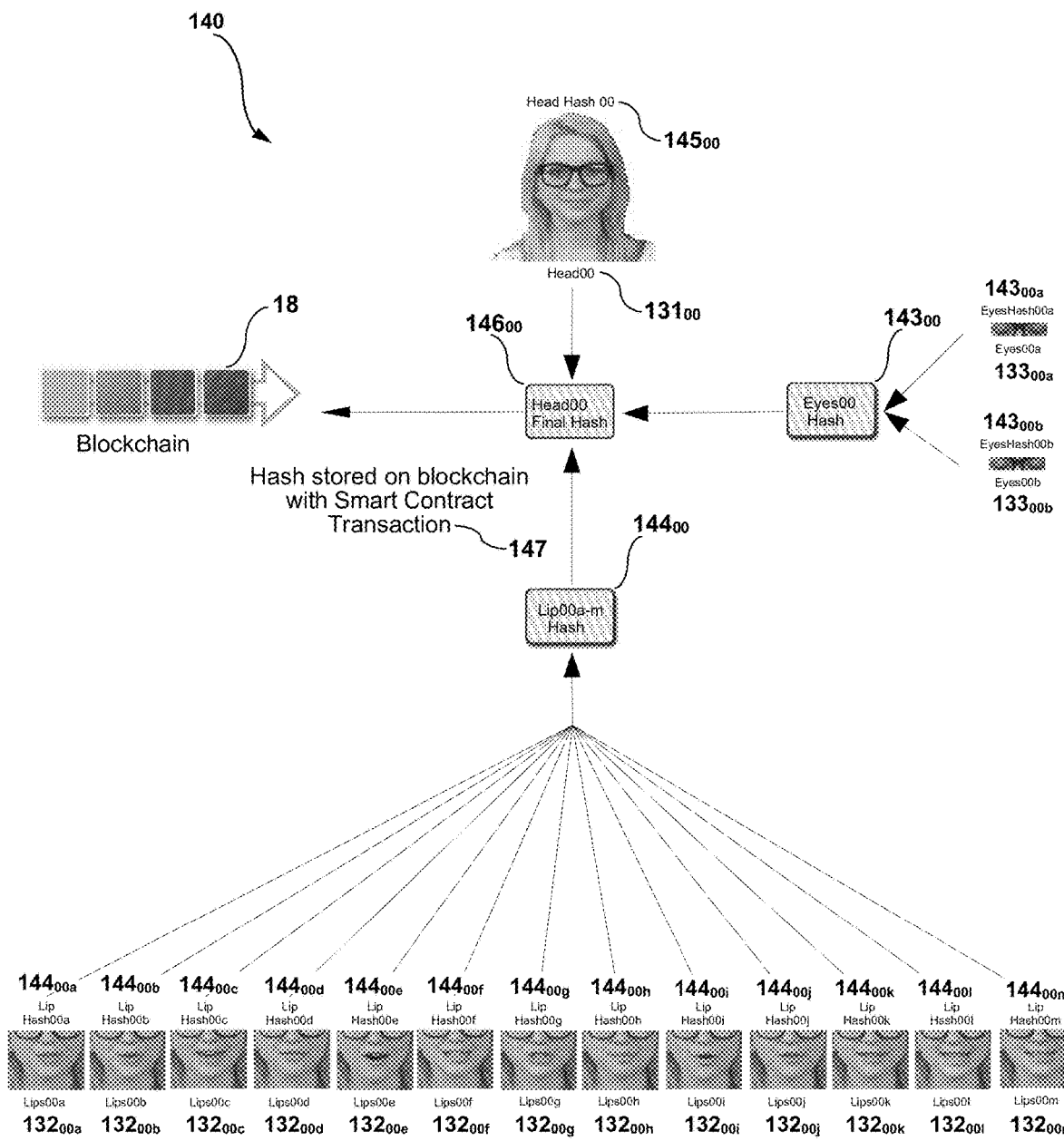
FIG. 24 is a schematic representation of a process for constructing a head hash Merkle tree of the present invention.

FIG. 24 is a schematic representation of a talking head Merkle tree hash 140 of the present invention.

As previously mentioned, and as shown in FIG. 23, a talking head 12 comprises a bitmap stack 130. Each talking head 12 comprises a bitmap stack 130, comprising different head bitmaps, which follow the format and syntax $131_{00}$, $131_{01}$, $131_{02}$, $131_{03}$, and $131_{04}$, and so on, each of which have different lip bitmaps, which follow the format and syntax $132_{00a}$, $132_{01a}$, $132_{02a}$, $132_{03a}$, and $132_{04a}$, and so on, respectively, and different eye bitmaps which follow the format and syntax $133_{00a}$, $133_{01a}$, $133_{02a}$, $133_{03a}$, and $133_{04a}$, and so on, respectively, the structure of which is similar to a tree 136, all stored in a talking head specially formatted file 138, such as a vsar file or other suitable file. Metadata is also stored in the talking head specially formatted file 138. In this instance, the specially formatted file is named a vsar file, although other suitable file names may be used.

A unique talking head Merkle tree hash 140 is calculated, using the bitmap stack 130, as follows:

hashes $143_{00a}$, $143_{01a}$, $143_{02a}$, $143_{03a}$, and $143_{04a}$, and so on, respectively, are calculated for each eye bitmap $133_{00a}$, $133_{01a}$, $133_{02a}$, $133_{03a}$, and $133_{04a}$, and so on, respectively, each of which is combined into an eye bitmap hash $143_{00}$;

hashes $144_{00a}$, $144_{01a}$, $144_{02a}$, $144_{03a}$, and $144_{04a}$, and so on, respectively, are calculated for each lip bitmap $132_{00a}$, $132_{01a}$, $132_{02a}$, $132_{03a}$, and $132_{04a}$, and so on, respectively, each of which is combined into a lip bitmap hash $144_{00}$;

hashes $145_{00}$, $145_{01}$, $145_{02}$, $145_{03}$, and $145_{04}$, and so on, respectively, are calculated for each head bitmap $131_{00}$, $131_{01}$, $131_{02}$, $131_{03}$, and $131_{04}$, and so on, respectively, each of which is combined into a head bitmap hash $145_{00}$;

the eye bitmap hash $143_{00}$, the lip bitmap hash $144_{00}$, and the head bitmap hash $145_{00}$, are each combined into a final head hash $146_{00}$.

The final head hash $146_{00}$ and the hash 24 of the publisher's identification 26 are stored on a blockchain 18 with a smart contract transaction 147, with each head hash having one blockchain entry per head bitmap.

Figure 25:
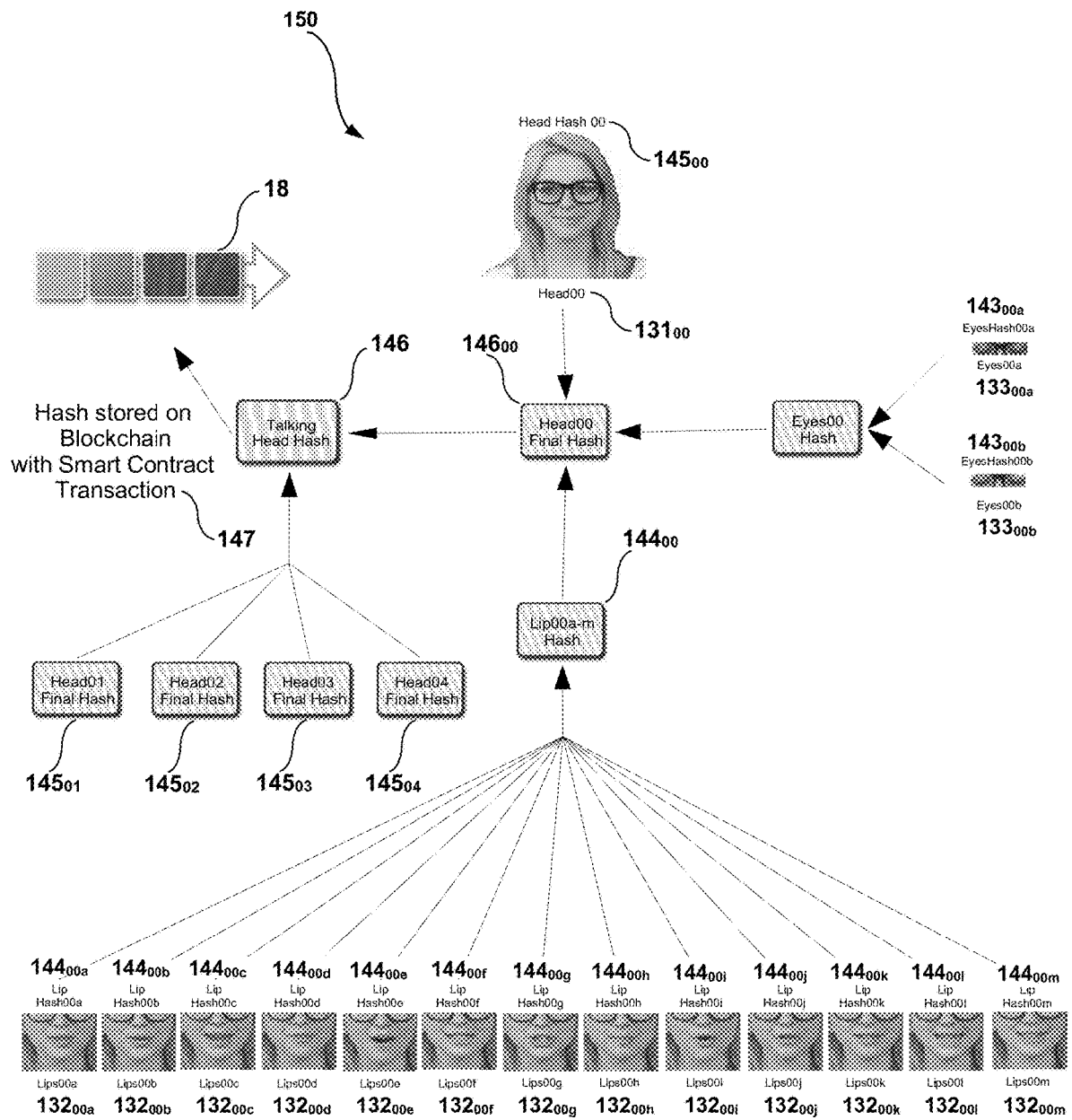
FIG. 25 is a schematic representation of a process for incorporating a plurality of head hashes into a Merkle tree of the present invention.

FIG. 25 is a schematic representation of a process for incorporating a plurality of head hashes into a Merkle tree 150 of the present invention. FIG. 24, on the other hand, shows the construction of one final head hash $146_{00}$ and storage on the blockchain 18 with one blockchain entry per bitmap.

It should be pointed out that a talking head show 14 has a plurality of talking heads 12, each being different from the other.

All final head hashes $145_{00}$, $145_{01}$, $145_{02}$, $145_{03}$, and $145_{04}$, and so on, of the plurality of head hashes are combined to form a talking head hash 146, which is then stored in a blockchain 18 with a smart contract transaction 147.

The talking head hash 146 is stored on the blockchain 18 as one blockchain entry with a smart contract transaction 147.

Figure 26:
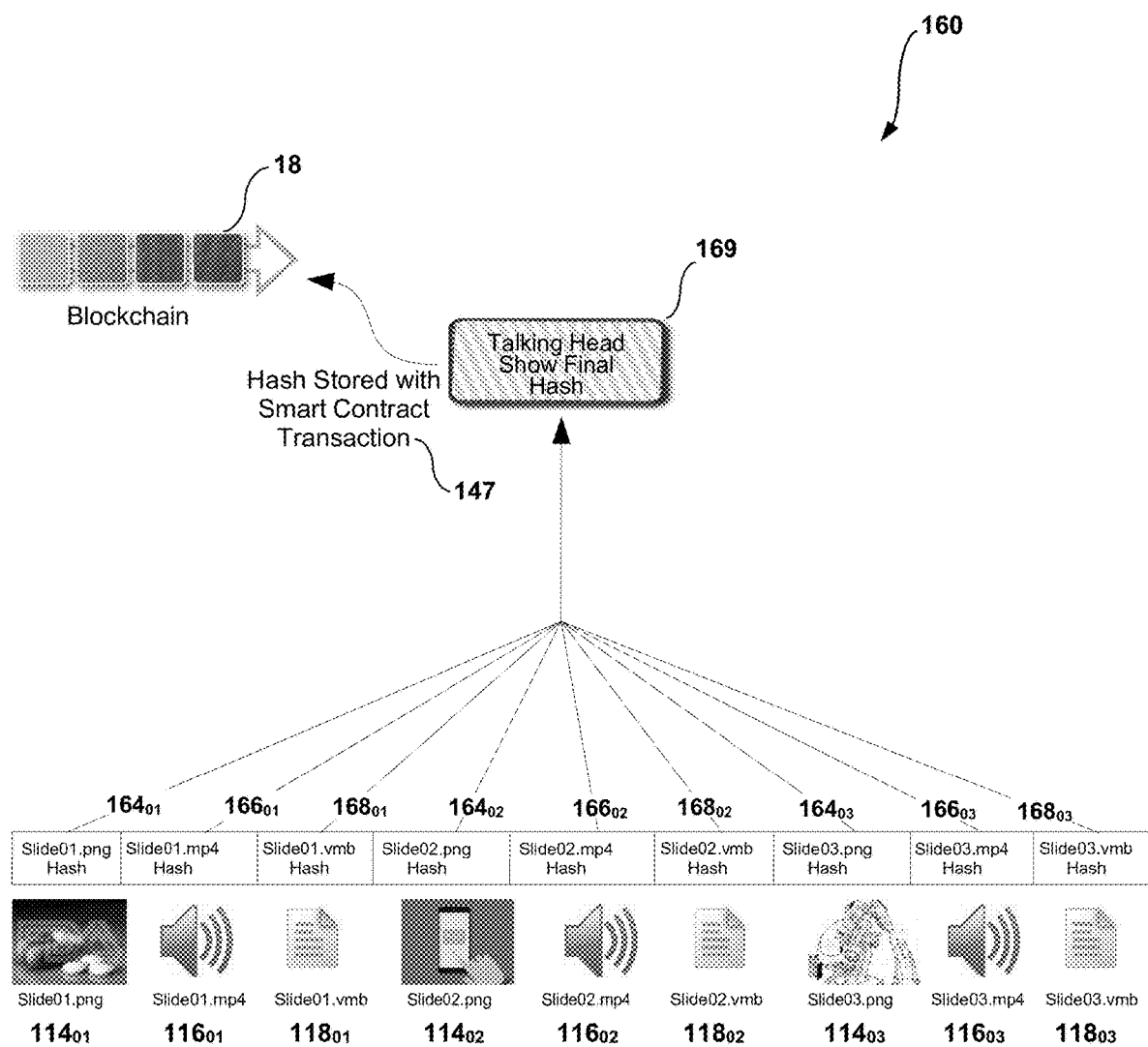
FIG. 26 is a schematic representation of a process for incorporating a talking head show into a talking head show final hash, in accordance with the present invention.

FIG. 26 is a schematic representation of a process 160 for incorporating a talking head show into a talking head show final hash, in accordance with the present invention.

The process 160 incorporates a talking head show into a talking head show final hash 169 and incorporates the talking head show final hash 169 into the blockchain 18, in accordance with the present invention. Again, a talking head show has a plurality of talking heads, each being different from the other.

The talking head show typically comprises a variety of different media files in addition to the talking heads, including, lip sync data, photos, slides, music, and movie files, stored in the specially formatted file of the present invention, which are hashed into hashed lip sync data, hashed photos, hashed slides, hashed music files, and hashed movie files, as shown in FIG. 26, to create a final talking head show hash 169. The final talking head show hash 169 is stored in the blockchain with a smart contract transaction for use with the final talking head hash 146 of FIG. 25.

As previously mentioned, and shown in FIG. 20, each talking head show specially formatted file 110 of FIG. 20 comprises a plurality of images and/or slide files, a plurality of audio files, and a plurality of header and/or metadata files, which follow the format and syntax $112_{01}$, $112_{02}$, and $112_{03}$, and so on, respectively; each of which comprises at least one image or slide file, which follow the format and syntax $114_{01}$, $114_{02}$, and $114_{03}$, and so on, respectively, a plurality of audio files, which follow the format and syntax $116_{01}$, $116_{02}$, and $116_{03}$, and so on, respectively, and a plurality of header and/or metadata files, which follow the format and syntax $118_{01}$, $118_{02}$, and $118_{03}$, and so on, respectively. Other suitable files may also be included. The talking head show specially formatted files 110 of FIG. 20 are typically retrieved sequentially; however, other suitable file retrieval methods may be used.

Other suitable files may also be included. The talking head show specially formatted files 110 of FIG. 20 are typically retrieved sequentially; however, other suitable file retrieval methods may be used. Other suitable files may also be included.

Each talking head show 14, then, comprises: a plurality of images and/or slide files $114_{01}$, $114_{02}$, and $114_{03}$, and so on respectively; a plurality of audio files $116_{01}$, $116_{02}$, and $116_{03}$, and so on, respectively; and a plurality of header and/or metadata files $118_{01}$, $118_{02}$, and $118_{03}$, and so on, respectively; each of which is hashed, as shown in FIG. 26, into hashed images and/or slide files $164_{01}$, $164_{02}$, and $164_{03}$, and so on respectively, hashed audio files $166_{01}$, $166_{02}$, and $166_{03}$, and so on respectively, and hashed header and/or metadata files $168_{01}$, $168_{02}$, and $168_{03}$, and so on respectively, Each of the hashed images and/or slide files $164_{01}$, $164_{02}$, and $164_{03}$, and so on respectively, hashed audio files $166_{01}$, $166_{02}$, and $166_{03}$, and so on respectively, and hashed header and/or metadata files $168_{01}$, $168_{02}$, and $168_{03}$, and so on respectively, are then combined into a talking head show hash 169.

The hash identification 24 of the publisher 27, or owner, and the final hash 169 of the talking head show 14 are then stored on the same block on the blockchain 18, using a Smart Contract Transaction 147.

Figure 27:
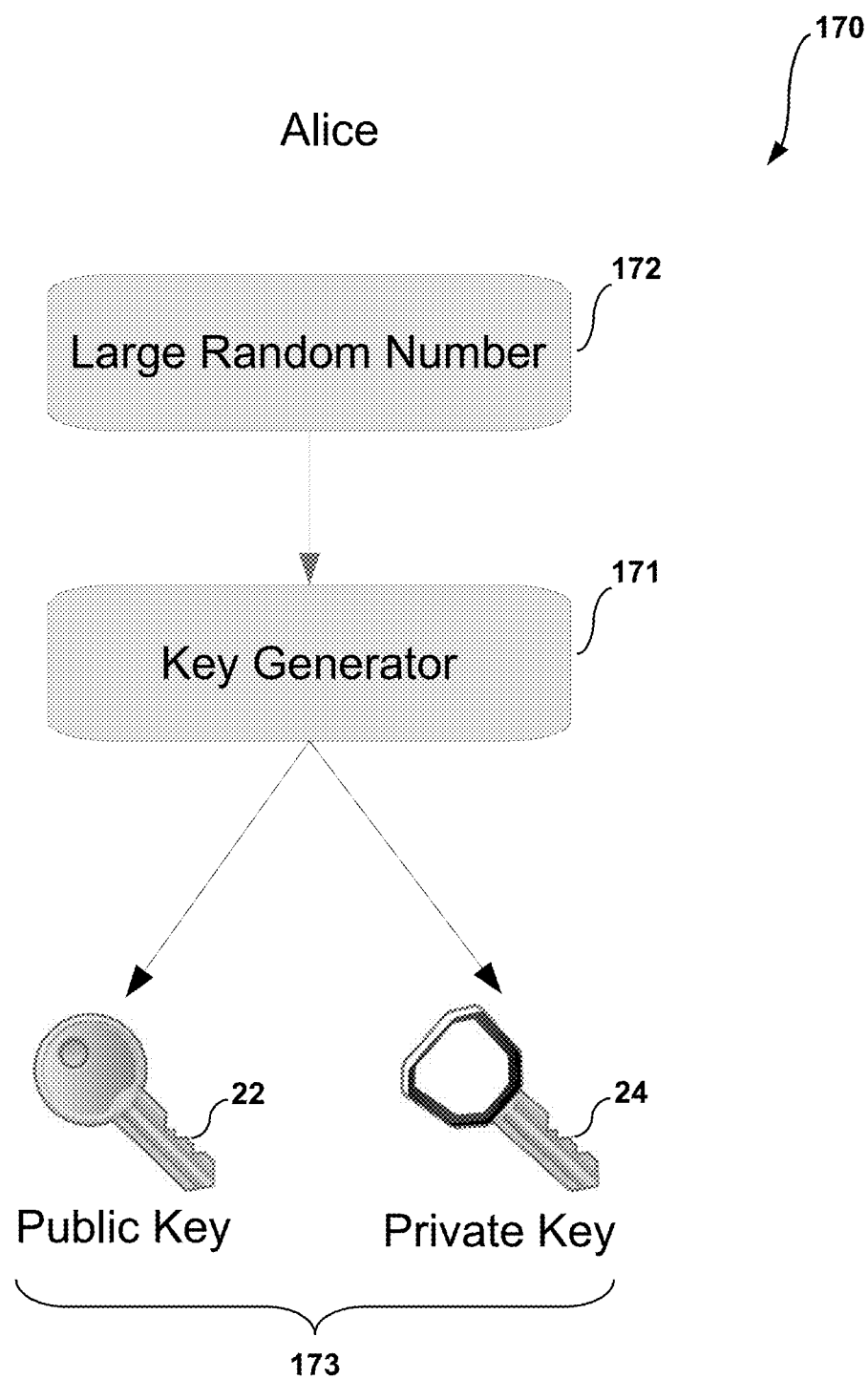
FIG. 27 is a schematic representation of public key cryptography.
Figure 28:
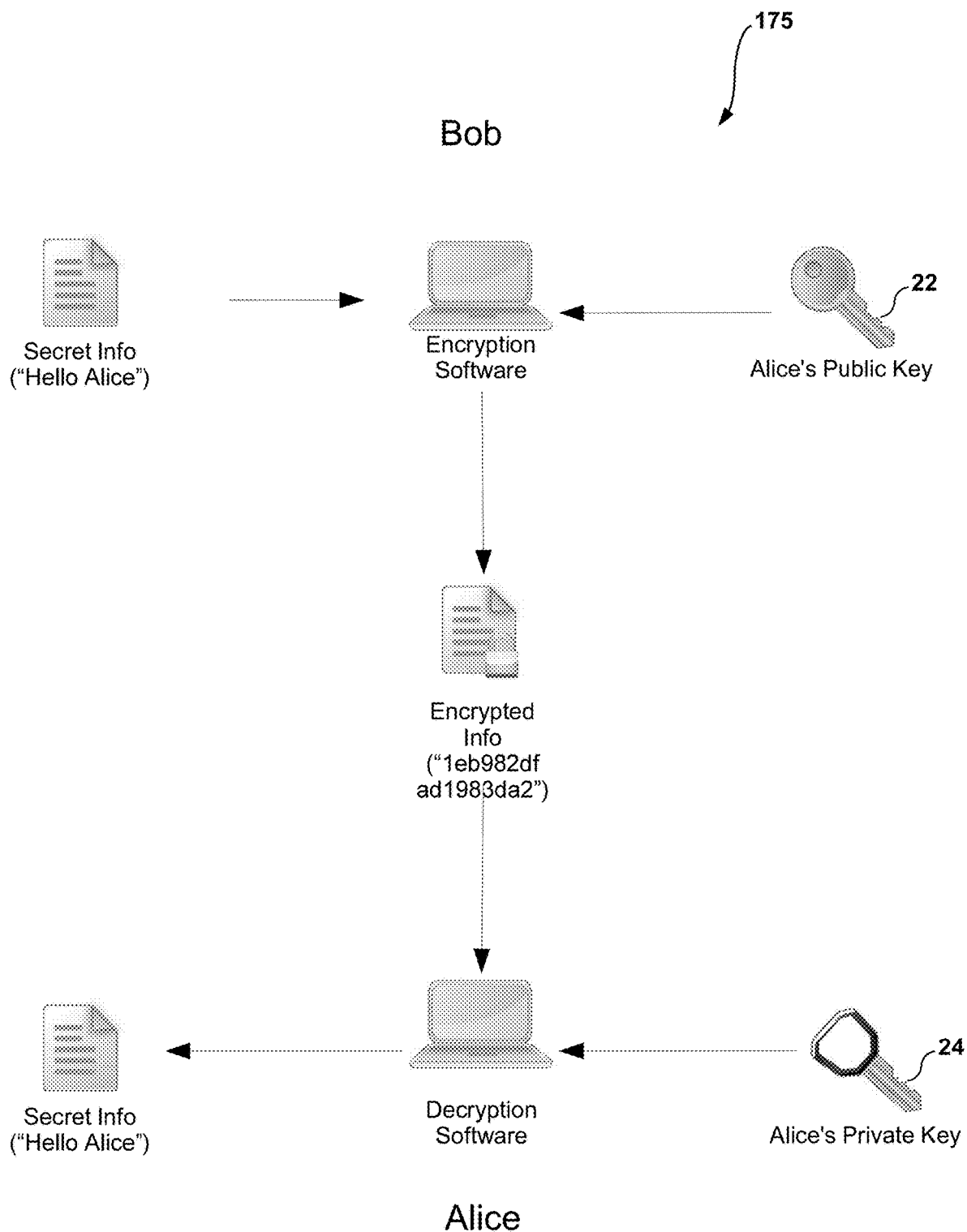
FIG. 28 is a schematic representation of public key/ private key encryption.
Figure 29:
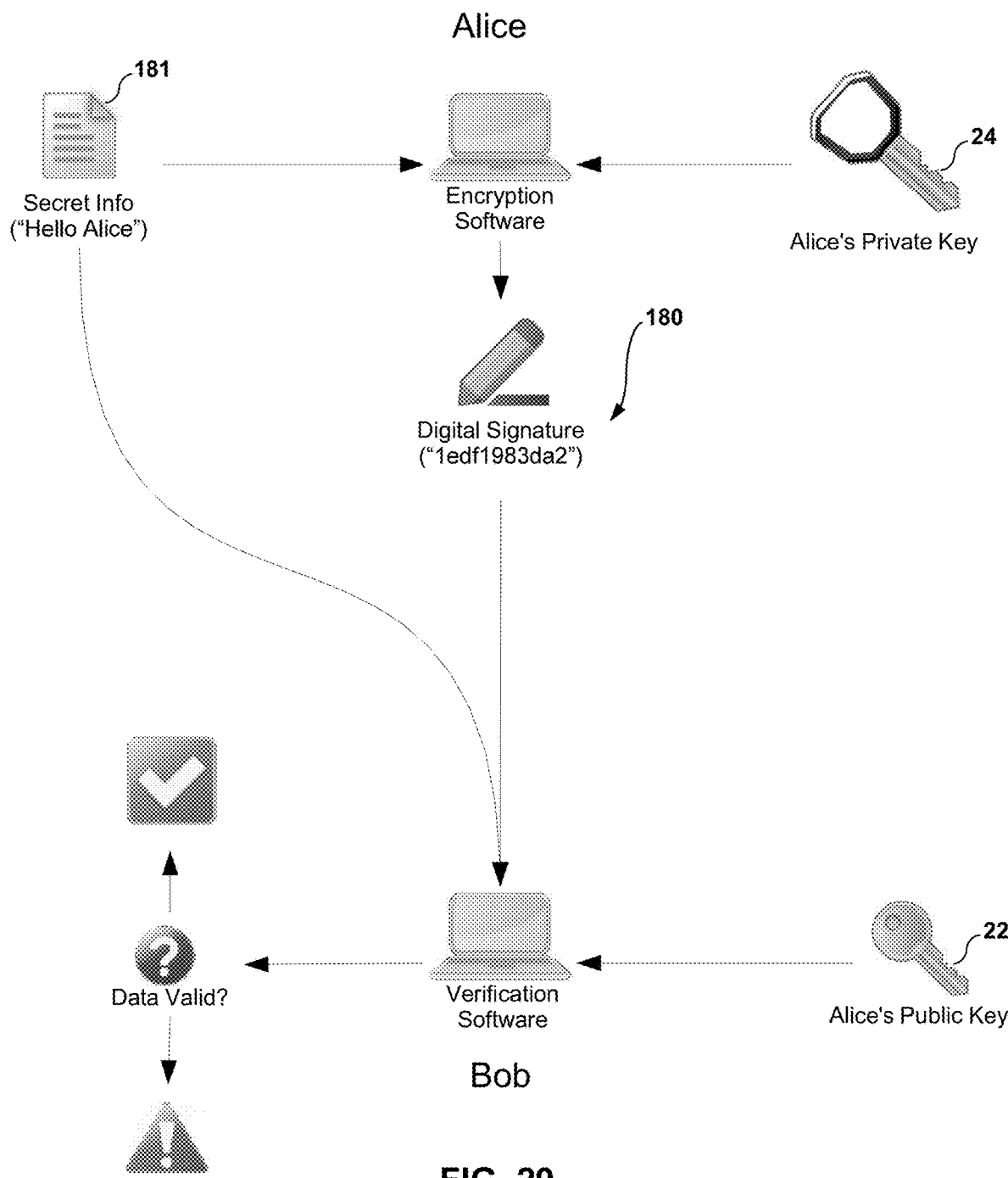
FIG. 29 is a schematic representation of a public key/ private key digital signature.

FIGS. 27-29 discuss public key cryptography, public/private keys, and public/private key digital signatures, respectively.

FIG. 27 is a schematic representation of public key cryptography 170. FIG. 27 shows that a key generator 171 may be used to generate a pair of asymmetric keys 173, including a public key 22 and a private key 24. The key generator 171 may use an unpredictable, large random number 172 or another suitable system or method to generate the asymmetric keys 173, which include a public key 22 and a private key 24.

FIG. 28 is a schematic representation of public key/private key encryption 175. FIG. 28 shows that in asymmetric key encryption, anyone can encrypt a message using a public key 22, but only the holder of the paired private key 24 can decrypt the message. Security of the message depends on the secrecy of the private key 24.

FIG. 29 is a schematic representation of the use of a public key, a private key, and a private key digital signature 180 to verify a document 181. FIG. 29 shows that if a unique digital signature 180 is created, based on the contents of the document 181 and a private key 24, then, if a user has knowledge of the private key digital signature 180 and the document 181, the document 181 can be verified with the public key 22.

Figure 30:
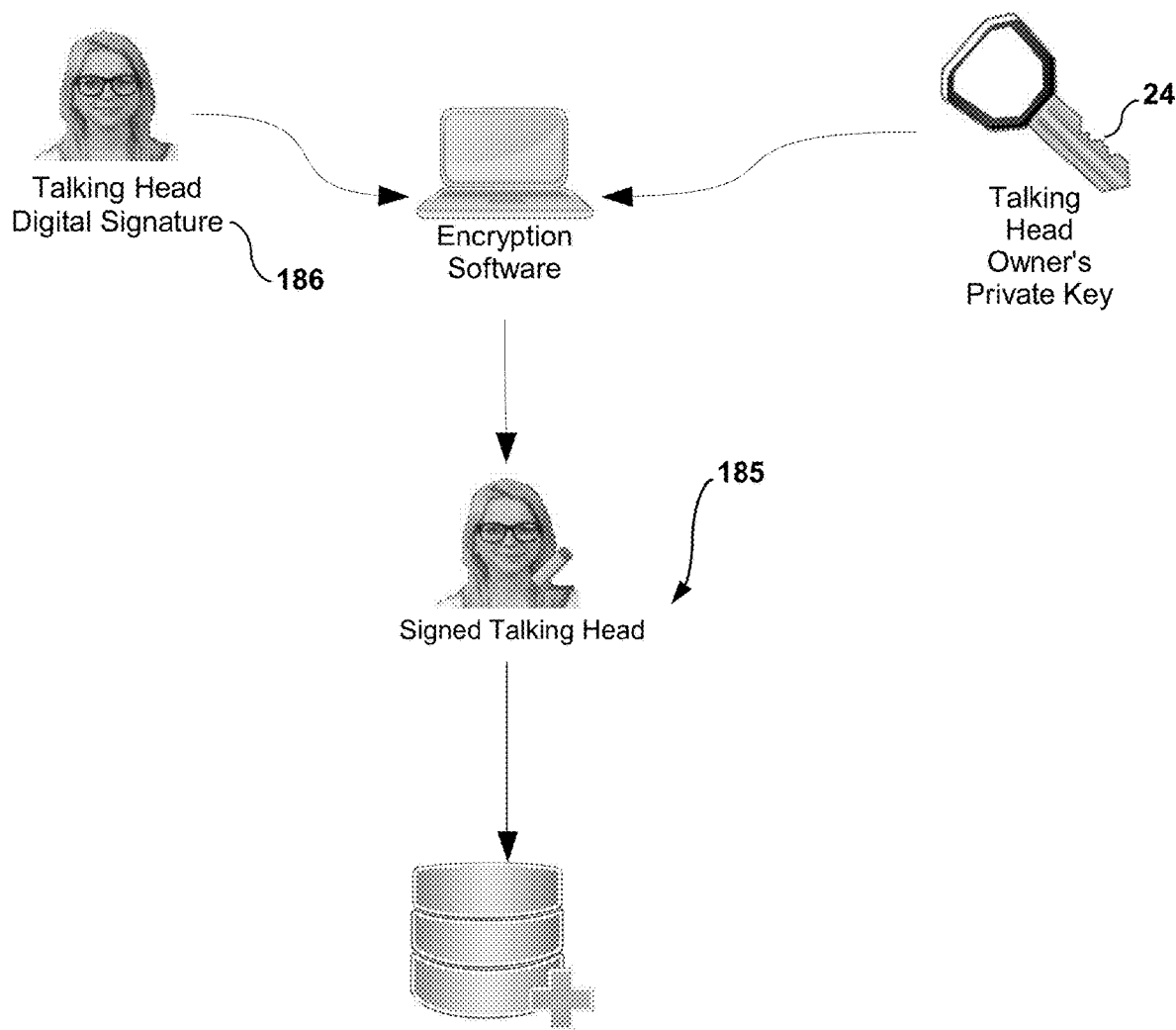
FIG. 30 is a schematic representation of a talking head digital signature.
Figure 31:
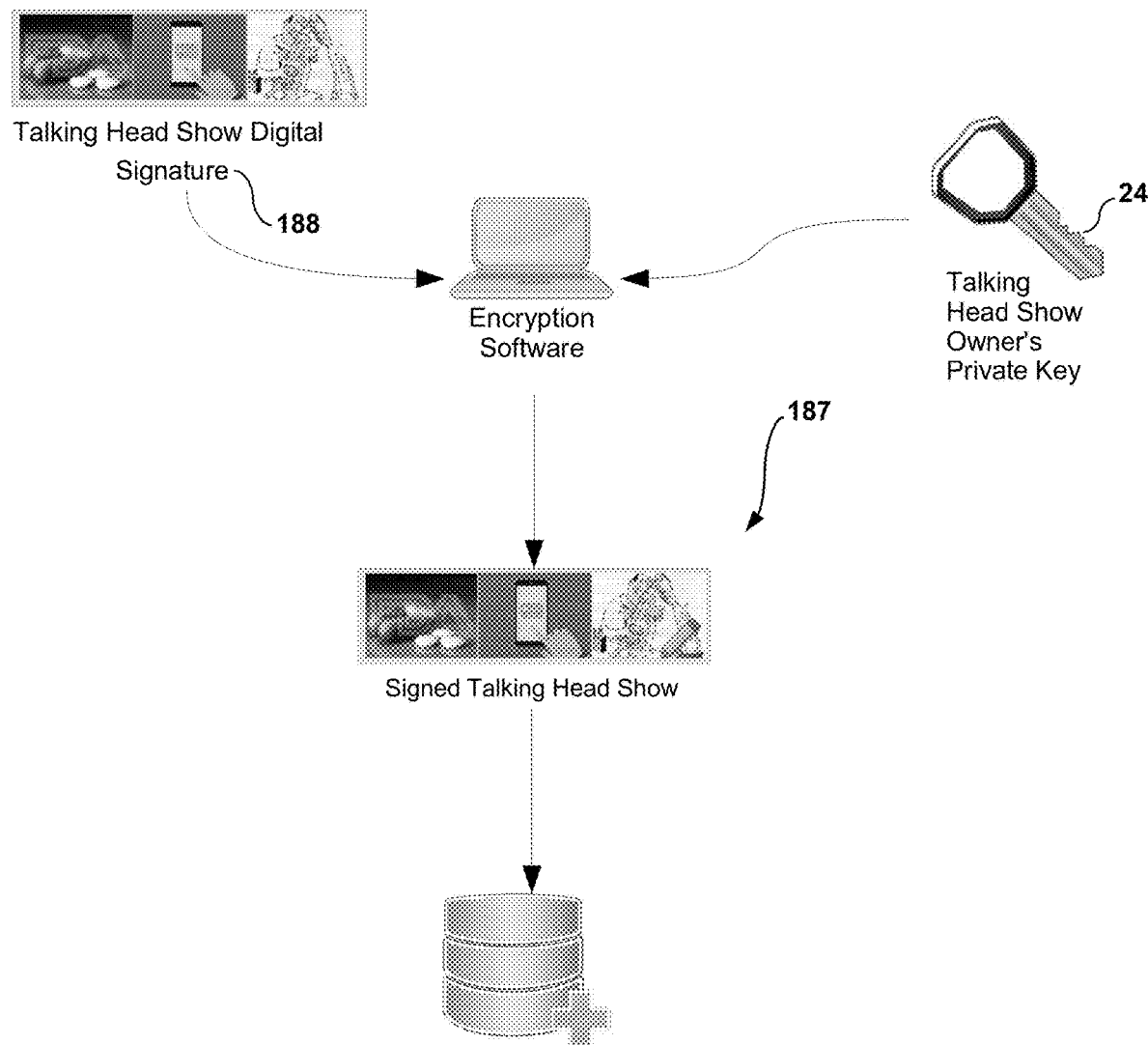
FIG. 31 is a schematic representation of a talking head show digital signature.

FIGS. 30 and 31 show a talking head digital signature and talking head show digital signature, respectively.

FIG. 30 is a schematic representation of a signed talking head 185, which shows that a talking head digital signature 186 and a talking head owner's private key 24 may be used to generate a signed talking head 185.

FIG. 31 is a schematic representation of a signed talking head show 187, which shows that a talking head show digital signature 188 and a talking head owner's private key 24 may be used to generate a signed talking head show 189.

Figure 32:
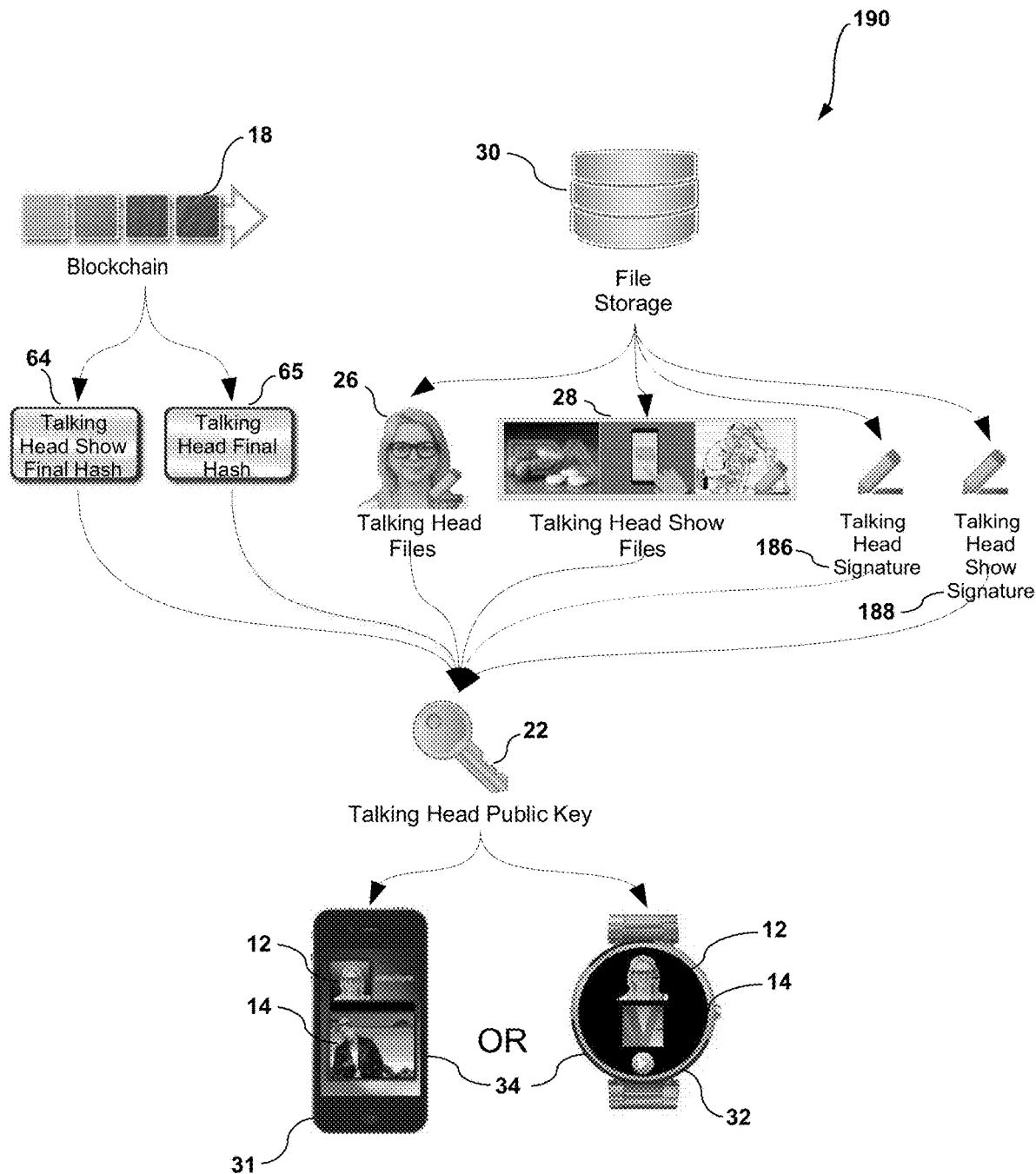
FIG. 32 is a schematic representation of a talking head and talking head show digital identity immutable dual authentication blockchain verification scheme, in accordance with the present invention.

FIG. 32 is a schematic representation of a talking head and talking head show digital identity immutable dual authentication blockchain verification scheme 190, in accordance with the present invention.

The talking head show hash and talking head hash 64 and 65, respectively, are downloaded, at 66, from the blockchain 18;

FIG. 32 shows talking head and talking head show digital identity immutable dual authentication blockchain verification 190, comprising:

downloading talking head files 26, talking head show files 28, and respective talking head signature file 186 and talking head show signature file 188 each from a server 30 into a playback device 31 and/or 32;

downloading respective talking head hash 65 and talking head show hash 64 from the blockchain 18 into the playback device 31 and/or 32;

using a talking head and talking head show public key 22 by the playback device 31 and/or 32 to validate the talking head and talking head show signatures 186 and 188, respectively, which determine whether the talking head signature 186 and talking head show signature 188 are correct;

if the talking head signature 186 and the talking head show signature 188 are correct, then the talking head Merkle tree hash 140 and the talking head show Merkle tree hash 169 are recalculated and checked against the respective talking head final hash 65 and the respective talking head show final hash 64 retrieved from the blockchain 18;

if the recalculated talking head Merkle tree hash and the recalculated talking head show Merkle tree hash downloaded from the server 30 and the talking head Merkle tree hash downloaded from the blockchain 18 and the talking head show Merkle tree hash downloaded from the blockchain 18 match, respectively, then playback 34 starts and the talking head 12 and the talking head show 14 play.

The talking head and talking head show may be any suitable talking head and/or talking head show.

Figure 33:
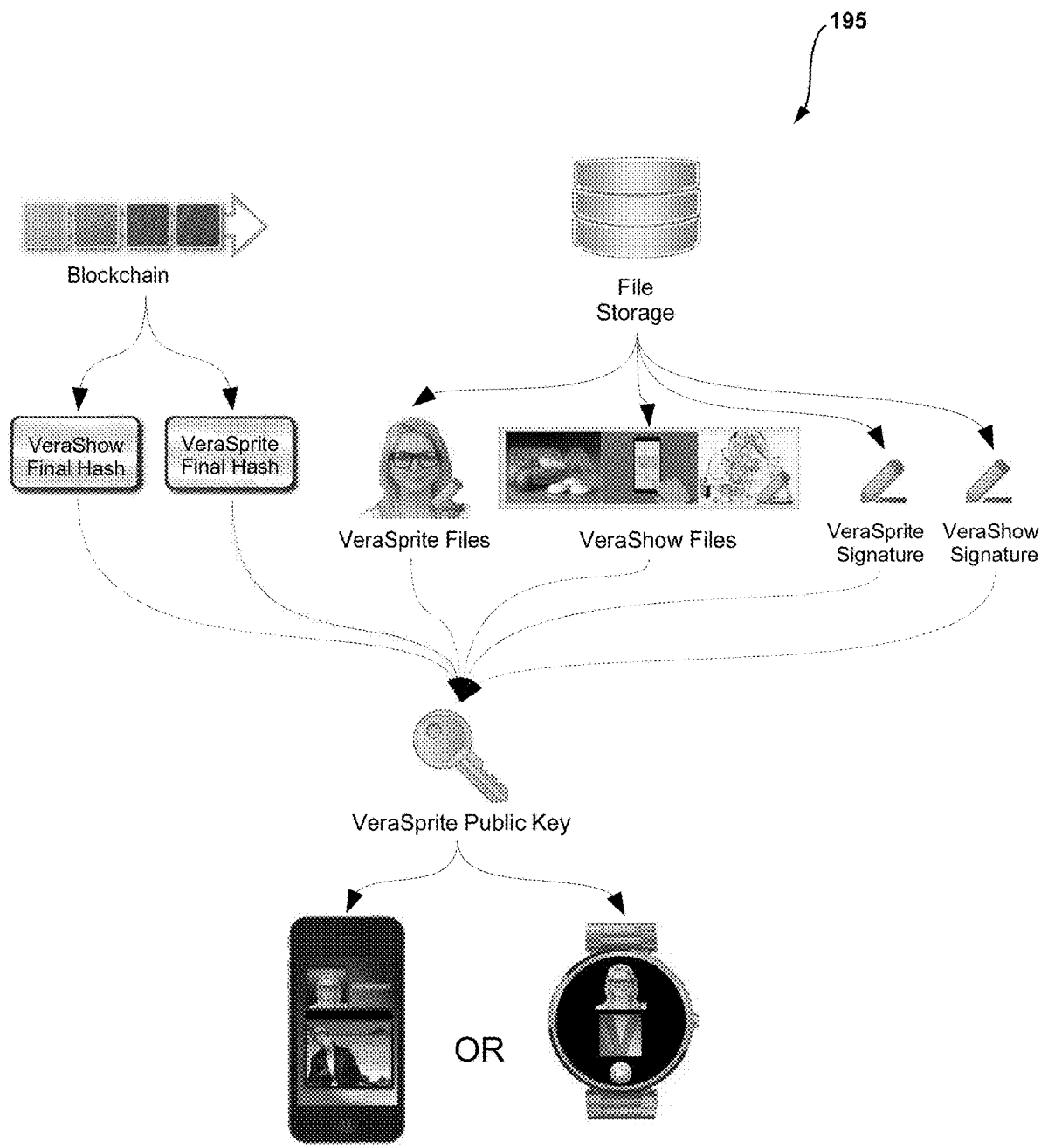
FIG. 33 shows an embodiment of the present invention, which uses the talking head and talking head show digital identity immutable dual authentication blockchain verification scheme of FIG. 32.

FIG. 33 shows an embodiment of the present invention 195, which uses the talking head and talking head show digital identity immutable dual authentication blockchain verification scheme of FIG. 32.

FIG. 33 shows particular examples of a talking head and talking head show, i.e., a VeraSprite™ talking head and VeraShow talking head show, which are well suited for use in the talking head and talking head show digital identity immutable dual authentication blockchain verification scheme, although any suitable talking head and/or talking head show may be used.

FIG. 33 shows that:

the VeraSprite™ VeraShow, and signature files are each downloaded from a file server;

the final hashes of the VeraSprite™ and the VeraShow are each downloaded from the blockchain into the playback device; the playback device checks the VeraSprite™ and the VeraShow signatures;

if the VeraSprite™ talking head signature and the VeraShow talking head show signature are correct, then the VeraSprite™ talking head and VeraShow talking head show Merkle tree hashes are recalculated and checked against the final hashes retrieved from the blockchain, respectively;

if the recalculated VeraSprite™ talking head Merkle tree hash and the recalculated VeraShow talking head show Merkle tree hash downloaded from the server and the VeraSprite™ talking head Merkle tree hash downloaded from the blockchain and the VeraShow talking head show Merkle tree hash downloaded from the blockchain match, respectively, then playback starts and the talking head show plays.

Again, the talking head and talking head show may be any suitable talking head and/or talking head show.

FIG. 34 is a schematic representation of features of immutable blockchain authentication schemes 200, which compares an immutable dual authentication scheme 202 and a distributed data network dual authentication scheme 204. In the immutable dual authentication scheme 202: hash codes reside on the blockchain; the talking head and the talking head show each reside on a web server; and publisher verification uses public and private keys. In the distributed data network dual authentication scheme 204: hash codes reside on the blockchain; the talking head and the talking head show each reside on a blockchain distributed network; and publisher verification uses a publisher code.

Although the present invention has been described in considerable detail with reference to certain preferred versions thereof, other versions are possible. Therefore, the spirit and scope of the appended claims should not be limited to the description of the preferred versions contained herein.

What is claimed is:

1. A talking head digital identity immutable dual authentication method, comprising:
   publishing a talking head and talking head show, comprising:
      incorporating talking head files and talking head show files into specially formatted files, comprising:
         hashing the talking head specially formatted files and the talking head show specially formatted files, using Merkle tree hashing,
         uploading the hashed talking head specially formatted files and the hashed talking head show specially formatted files, each to a blockchain, signing the talking head specially formatted files and the talking head show specially formatted files,
         uploading the signed talking head specially formatted files and the signed talking head show specially formatted files, each to a server;
   verifying the talking head and the talking head show, comprising:
      verifying signatures of the signed talking head specially formatted files and the signed talking head show specially formatted files,
      verifying that hashes of the signed talking head specially formatted files and the talking head show specially formatted files from the server match the hashes of the hashed talking head and the hashed talking head show specially formatted files from the blockchains, comprising:
         downloading the signed talking head specially formatted files and the signed talking head show specially formatted files, each from the server;
         recalculating hashes of the downloaded signed talking head specially formatted files and the downloaded signed talking head show specially formatted files, each from the server, using unique bitmap stacks of the talking head and the talking head show files,
            the recalculated hash values comprising Merkle Tree hash values of the downloaded signed talking head specially formatted files and the downloaded signed talking head show specially formatted files;
         downloading the hashed talking head specially formatted files and the hashed talking head show specially formatted files, each from the blockchain,
      verifying that the recalculated hash values of the signed talking head specially formatted files and the hashes of the talking head show specially formatted files from the server match the hashes of the hashed talking head and the hashed talking head show specially formatted files from the blockchain;
   playing back the talking head show, if the recalculated hash values of the signed talking head specially formatted files and the talking head show specially formatted files from the server match the hashes of the hashed talking head and the hashed talking head show specially formatted files from the blockchain.

2. The talking head digital identity immutable dual authentication method according to claim 1, wherein:
   the publishing, the verifying, and the playing back are performed on a peer to peer network.

3. The talking head digital identity immutable dual authentication method according to claim 1, wherein:
   the unique bitmap stacks of the talking head and talking head show files comprise head bitmaps, lip bitmaps, and eye bitmaps.

4. The talking head digital identity immutable dual authentication method according to claim 3, wherein:
   each head bitmap of the head bitmaps, each lip bitmap of the lip bitmaps, and each eye bitmap of the eye bitmaps are combined into a final head hash.

5. The talking head digital identity immutable dual authentication method according to claim 4, wherein:
   the final head hash is stored on the blockchain with a smart contract transaction.

6. The talking head digital identity immutable dual authentication method according to claim 1, wherein:
   if the recalculated hash values of the signed talking head specially formatted files and the talking head show specially formatted files from the server do not match the hashes of the hashed talking head and the hashed talking head show specially formatted files from the blockchain, then the playing back does not start.

7. A talking head digital identity immutable dual authentication method, comprising:
   downloading signed talking head and signed talking head show files from a server;
   downloading final hash values of a talking head and talking head show from a blockchain;
   recalculating hash values of the signed talking head and the signed talking head show files,
      the recalculated hash values comprising Merkle Tree hash values of the talking head and the talking head show,
         the recalculated hash values comprising the Merkle Tree hash values of the talking head and the talking head show are recalculated using unique bitmap stacks of the talking head and the talking head show files;
   comparing the recalculated hash values of the talking head and the talking head show files with the hash values of the talking head and the talking head show retrieved from the blockchain;
   authenticating the talking head and talking head show files, if the recalculated hash values of the talking head and the talking head show received from the server match the hash values received from the blockchain.

8. The talking head digital identity immutable dual authentication method according to claim 7, wherein:
the unique bitmap stacks of the talking head and talking head show files comprise head bitmaps, lip bitmaps, and eye bitmaps.

9. The talking head digital identity immutable dual authentication method according to claim 8, wherein:
each head bitmap of the head bitmaps, each lip bitmap of the lip bitmaps, and each eye bitmap of the eye bitmaps are combined into a final head hash.

10. The talking head digital identity immutable dual authentication method according to claim 9, wherein:
the final head hash is stored on the blockchain with a smart contract transaction.

11. The talking head digital identity immutable dual authentication method according to claim 7, wherein:
if the recalculated hash values of the signed talking head specially formatted files and the talking head show specially formatted files from the server match the hashes of the hashed talking head and the hashed talking head show specially formatted files from the blockchain, then playback on a playback device starts.

12. The talking head digital identity immutable dual authentication method according to claim 7, wherein:
if the recalculated hash values of the signed talking head specially formatted files and the talking head show specially formatted files from the server do not match the hashes of the hashed talking head and the hashed talking head show specially formatted files from the blockchain, then playback on a playback device does not start.

13. A talking head digital identity immutable dual authentication method, comprising:
downloading talking head and talking head show files from a server;
downloading final hash values of a talking head and talking head show from a blockchain;
recalculating hash values of the talking head and the talking head show files, using unique bitmap stacks of the talking head and the talking head show files, the recalculated hash values comprising Merkle Tree hash values of the talking head and the talking head show;
comparing the recalculated hash values of the talking head and the talking head show files with the hash values of the talking head and the talking head show retrieved from the blockchain;
authenticating the talking head and talking head show files, if the recalculated hash values of the talking head and the talking head show retrieved from the server match the hash values received from the blockchain;
if the recalculated hash values of the signed talking head specially formatted files and the talking head show specially formatted files from the server match the hashes of the hashed talking head and the hashed talking head show specially formatted files from the blockchain, then playback on a playback device starts, otherwise, playback does not start.

14. The talking head digital identity immutable dual authentication method according to claim 13, wherein:
the unique bitmap stacks of the talking head and talking head show files comprise head bitmaps, lip bitmaps, and eye bitmaps.

15. The talking head digital identity immutable dual authentication method according to claim 14, wherein:
head bitmap hashes are calculated for the head bitmaps;
lip bitmap hashes are calculated for the lip bitmaps;
eye bitmap hashes are calculated for the eye bitmaps;
the head bitmap hashes, the lip bitmap hashes, and the eye bitmap hashes are combined into a final head hash.

16. The talking head digital identity immutable dual authentication method according to claim 15, wherein:
the final head hash is stored on the blockchain with a smart contract transaction.

* * * * *